United States Patent [19]
Aubry et al.

[11] Patent Number: 4,815,937
[45] Date of Patent: Mar. 28, 1989

[54] COMBINED BEARING DEVICE FOR A ROTORCRAFT ROTOR AND A ROTOR EQUIPPED WITH SUCH A BEARING DEVICE

[75] Inventors: Jacques A. Aubry; Jean J. Mondet, both of Bouches-du-Rhône, France

[73] Assignee: Aerospatiale Societe Nationale Industrielle, Paris, France

[21] Appl. No.: 172,679

[22] Filed: Mar. 24, 1988

[30] Foreign Application Priority Data

Mar. 3, 1987 [FR] France ................. 87 04381

[51] Int. Cl.4 ............................................ B64C 27/38
[52] U.S. Cl. .................................... 416/140; 416/141; 416/134 A
[58] Field of Search ................ 416/134 A, 138 A, 140, 416/141

[56] References Cited

U.S. PATENT DOCUMENTS

| | | | |
|---|---|---|---|
| 2,815,821 | 12/1957 | Echeverria | 416/141 X |
| 2,949,967 | 8/1960 | Jovanovich | |
| 3,504,989 | 4/1970 | Kisovec | 416/141 X |
| 4,129,403 | 12/1978 | Watson | 416/134 A |
| 4,222,709 | 9/1980 | Mouille | 416/134 A |
| 4,227,858 | 10/1980 | Donguy | 416/141 X |
| 4,249,862 | 2/1981 | Waddington et al. | 416/134 A |
| 4,257,739 | 3/1981 | Covington et al. | 416/141 X |
| 4,273,511 | 6/1981 | Mouille et al. | 416/134 A |
| 4,293,277 | 10/1981 | Aubry | 416/134 A |
| 4,297,080 | 10/1981 | Krauss et al. | 416/141 |
| 4,676,720 | 6/1987 | Niwa et al. | 416/141 X |

FOREIGN PATENT DOCUMENTS 2256347 1/1974 France .
2001026 7/1978 United Kingdom .

*Primary Examiner*—Everette A. Powell, Jr.
*Attorney, Agent, or Firm*—Armstrong, Nikaido, Marmelstein & Kubovcik

[57] ABSTRACT

The invention relates to a combined bearing device for a rotorcraft rotor or a rotor equipped with such a bearing device. In the rotor, each blade is held on the hub by a flexible arm surrounded without contact by a rigid stub sleeve by a combined bearing device including a cylindrical plain angle of attach bearing, a spherical ball joint with visco-elastic element for resiliently returning the blade under flapping and drag conditions, and with an integrated damper for damping the angular oscillations of the blade under drag conditions, of the hydraulic rotation damper type with vanes for laminating the hydraulic fluid and compensation chambers for the expansion of this latter, the hydraulic damper being integrated in the spherical thrust bearing and its compensation chambers belonging to a hydraulic automatic play take-up device for the plain bearing.

52 Claims, 12 Drawing Sheets

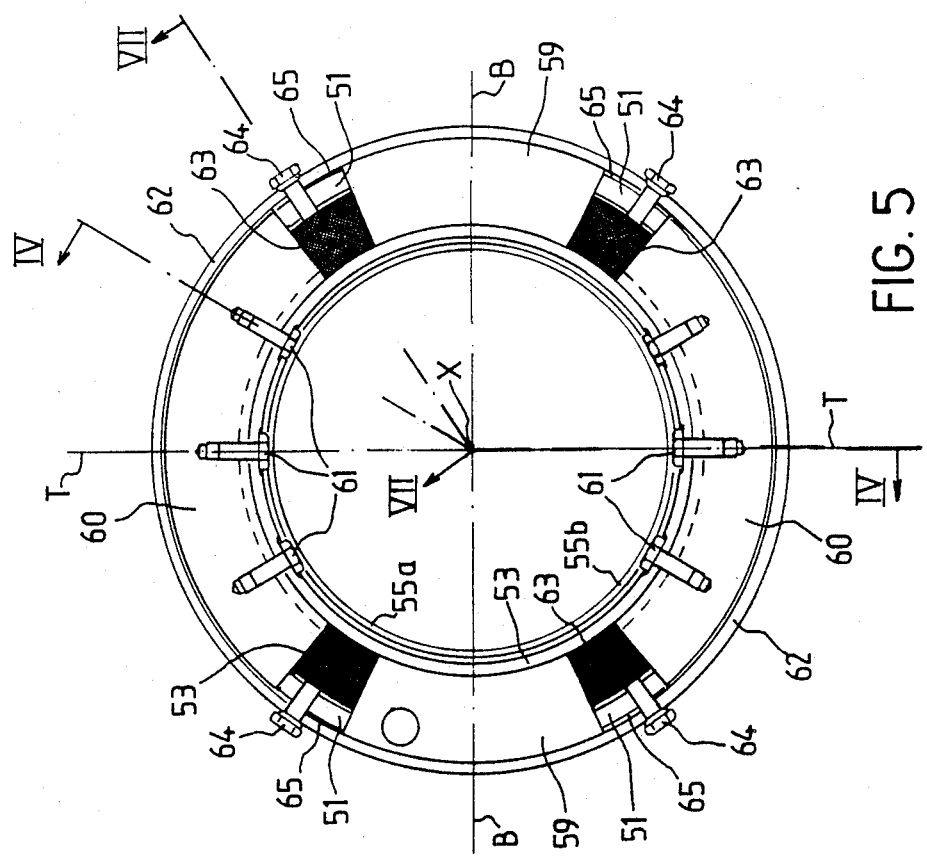
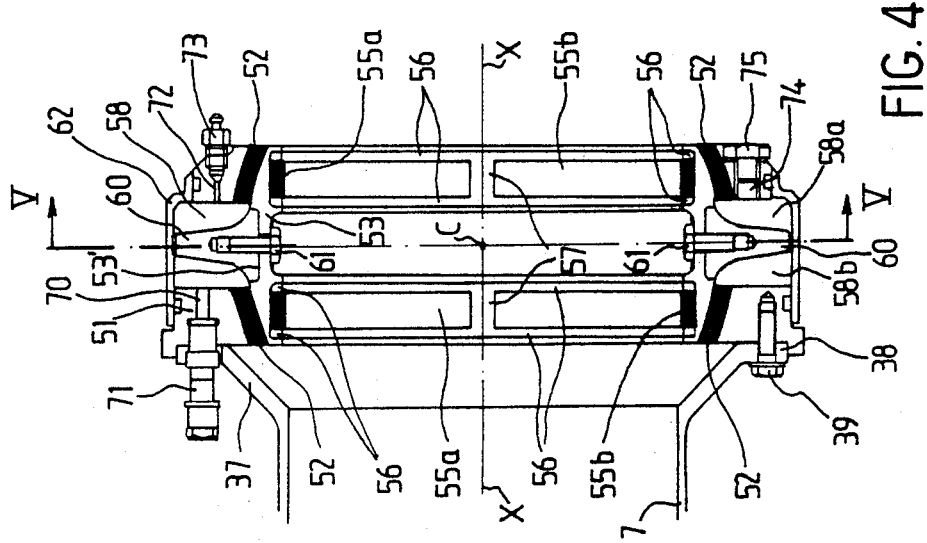
FIG. 5
FIG. 4

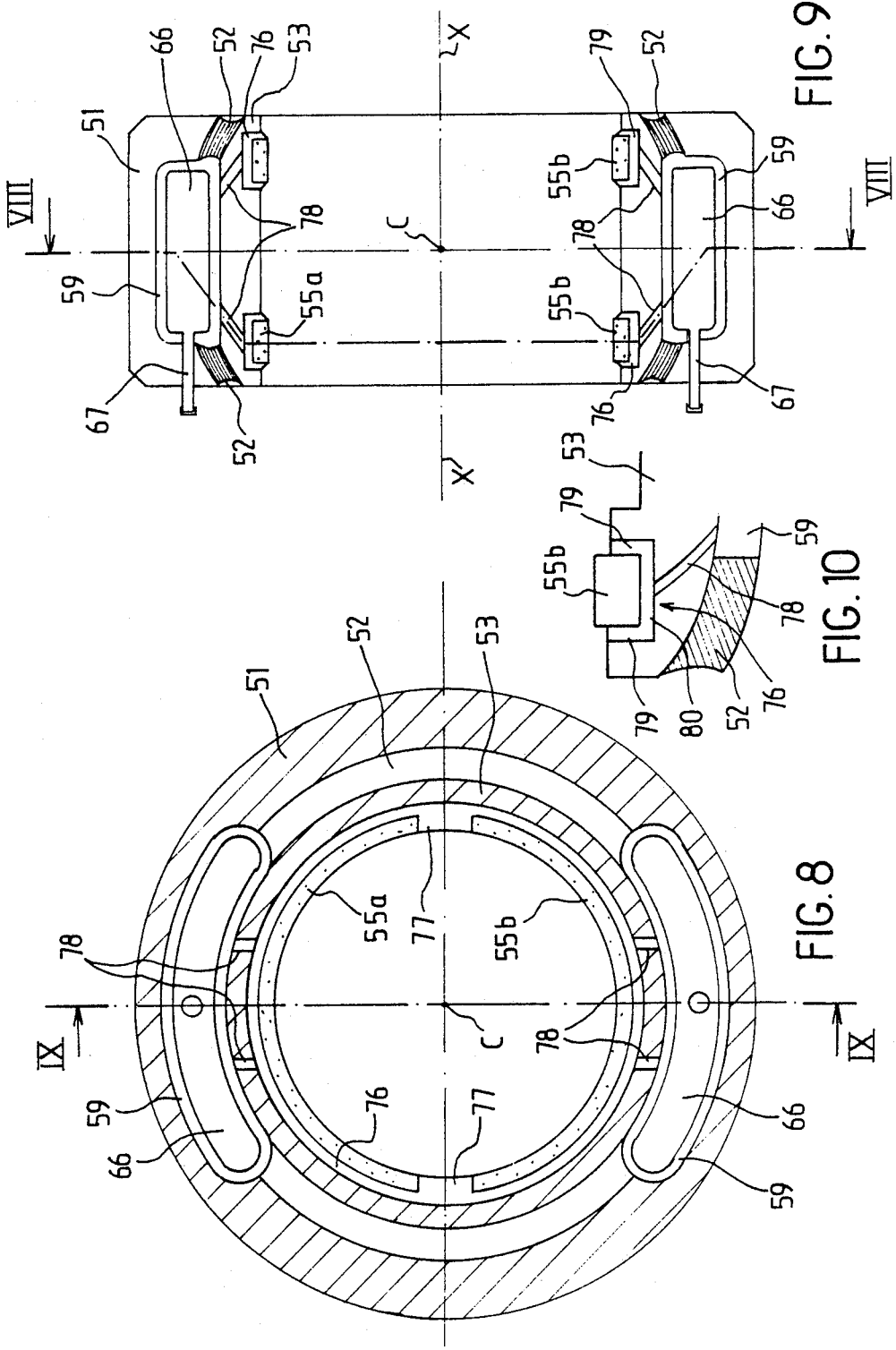

COMBINED BEARING DEVICE FOR A ROTORCRAFT ROTOR AND A ROTOR EQUIPPED WITH SUCH A BEARING DEVICE

BACKGROUND OF THE INVENTION

1. Field of the Invention

The present invention relates to a combined bearing device, for equipping the variable pitch rotors of rotorcraft and, in particular, the main or lift and rear or antitorque rotors of helicopters, of the particular type in which each blade is retained on the hub of the rotor by an elongate arm, substantially radial with respect to the axis of rotation of the rotor, rigid in the longitudinal direction so as to transmit the centrifugal forces from the blade and flexible under torsion and flexion forces so as to allow the angular flapping and drag oscillations of the blade as well as variations of its pitch, and which is surrounded without contact, as far as the vicinity of the hub, by a rigid tubular sleeve controlled externally by means of a lever controlling the pitch of the blade, and whose end the closest to the axis of the rotor is connected to the hub by the combined bearing device, which surrounds the root of the flexible arm on the hub.

In a rotor of this particular type, the combined bearing device forming the object of the invention fulfills simultaneously the functions of angle of attack bearing, of bearing for resiliently returning the corresponding blade under drag and flapping conditions, and finally of incorporated or internal bearing for damping the oscillatory movements of the blade under drag conditions.

2. Description of the Prior Art

Variable pitch and main or antitorque rotors and rotor hubs for helicopters, having the particular structure described above and equipped with a combined bearing device such as also described above are already known from the French Pats. No. 2 397 325 and 2 397 327 of the applicant.

French Pat. No. 2 397 327 describes a variable pitch rotor in which the flexible arm is an elongate connecting element formed essentially by a bundle of high mechanical strength fibers, coated individually for example with a resin and agglomerated together by a vulcanized elastomer. The outer and inner ends, with respect to the axis of rotation of the rotor, of the rigid tubular sleeve are fixed respectively to the foot of the corresponding blade and to a rigid ring on which is externally articulated the lever controlling the blade pitch. The position of the flapping axis of each blade is determined by spherical ball-joint elements, made preferaby from stratified elastomer, which are inserted respectively between rigid parts of the hub and the rigid ring fixed to the internal end of the sleeve, and frequency adapters, or dampers damping essentially the oscillating movements of the blade under drag conditions, preferably formed by elastomer plates of great stiffness and high hysteresis, are associated respectively with the spherical ball-joint elements.

In such a rotor, the action of the lever controlling the pitch of each blade on the rigid ring fixed to the tubular sleeve, for varying the angle of attack of the corresponding blade, causes a shearing force to be exerted on the stratified elastomer spherical ball-joint elements, which have a certain elastic return capacity opposing such control, as well as the angular oscillations of the blade under flapping and drag conditions whereas damping of the oscillating movements of the blade under drag conditions is provided by the plates of the frequency adapters, which are either inserted between the rigid parts of the hub and the spherical ball-joint elements, or shaped so as to be incorporated in the stratified elastomer spherical ball-joint elements.

In this French patent, this rotor structure is usable advantageously as main rotor for a light helicopter in which the bundles of fibers of the connecting elements of at least two blades form part of a single bundle of fibers, having at least one intermediate part, incorporated in the rotor hub which, perpendicularly the the plane of this rotor, has a thickness slightly greater than that of the connecting elements of the blades. In addition, the rigid parts of the hub which support the stratified spherical ball-joint elements (formed of an alternating stack of elastomers and rigid cups, made for example from metal) are formed by rigid preferably metal plates which are fixed respectively to the upper and lower faces of the hub and which extend cantilever fashion on each side of each element or connecting arm, at least as far as the level of the position chosen for the flapping axis of the corresponding blade.

In French Pat. No. 2 397 325, the flexible and torsible arm, which connects each rotor blade to the hub, and is in particular intended for the main rotor of a helicopter, is in fact a leaf, and the outer ends, with respect to the axis of rotation of the rotor, of the leaf and of the sleeve which surrounds it are joined to the end of the current part or to the foot of the corresponding blade, whereas the inner end of the tubular sleeve is, as in the above mentioned patent, fixed to a rigid ring on which the lever controlling the blade pitch is externally articulated. The position of the flapping axis of each blade is defined, in the corresponding flexible leaf, by spherical ball-joint elements, made preferably from stratified elastomer, which are inserted respectively between the two large flat faces of the flexible leaf and the rigid ring, so that the center of the spherical ball-joint is situated substantially on the longitudinal axis of the flexible leaf. In addition, as in the first French patent mentioned, drag frequency adapters or dampers damping the oscillating movements of the blades under drag conditions, formed preferably by elastomer plates with great stiffness and high hystersis, are associated respectively with the spherical ball-joint elements, these plates being either inserted respectively between the two large flat faces of the flexible blade and the corresponding spherical ball-joint elements, or shaped so as to be incorporated in the stratified elastomer spherical ball-joint elements. In the first cast, the spherical ball-joint elements are disposed between two substantially concentric annular supports, one of which, in an external radial position with respect to the axis of the flexible leaf, is fixed to the rigid ring connected to the inner end of the sleeve, whereas the other, in an internal radial position, is connected by the visco-elastic plates of the frequency adapters to rigid support plates which are not fixed to the hub but to the flat faces of the internal end, with respect to the axis of rotation of the rotor, of the corresponding flexible leaf providing connection of the corresponding blade to the hub.

In order to facilitate this connection, each flexible leaf may be extended, beyond the rigid ring fixed to the corresponding tubular sleeve, in the direction of the rotor shaft, by a thicker terminal element, by means of which the leaf is connected to the rotor hub, preferably by means of two pins passing through two coinciding bores in the terminal element of the leaf and radial extensions of the hub.

In the case of a rotor having a number of pairs of blades opposite each other, it is advantageous for the same number of flexible and torsible leaves to be disposed so that their median superimposed parts are immobilized in the case carried by the upper end of the rotor shaft, so as to form the hub therefrom, the two free ends of each leaf, external to the case, forming respectively the radial leaves whose outer ends are joined respectively to the feet of the blades of the same pair.

When each of the rotor blades is formed by a longitudinal member in the form of a leaf, surrounded by a profiled shell, it is then advantageous for the outer ends, with respect to the axis of rotation of the rotor, respectively of each leaf and of the tubular sleeve which surrounds it to be joined respectively to the inner ends of the longitudinal member and of the profiled shell of the corresponding blade.

Each tubular sleeve and the profiled shell of the corresponding blade may be made as a single piece and each leaf and the longitudinal member of the corresponding blade may also be made as a single piece. But it is also possible for the outer end of each leaf to be joined to the foot of the corresponding blade through at least one pivot, with its axis substantially perpendicular to the plane of the rotor.

Furthermore, from the French patent application No. 85 19418 of the applicant, a rotation damper is known having a stator and a rotor which are coaxial, two end faces transversal to the common axis of the stator and the rotor are disposed respectively on each side thereof, a man chamber filled with a hydraulic fluid and defined between the end faces and the stator and the rotor, at least one vane, but preferably several vanes arranged on the stator and rotor dividing the main chamber into several volumes, means for laminating the hydraulic fluid through the different volumes of the main chamber, and at least one auxiliary chamber in communication with the main chamber, each auxiliary chamber being at least partially defined by a resiliently deformable membrane for counterbalancing the variations of volume of the fluid as a function of its temperature.

In the case where the rotation damper has only a single auxiliary chamber, this latter is advantageously defined between one of the end damper faces and a resiliently deformable membrane and is associated with this end face, which is formed with at least one passage for commnication between the auxiliary and main chambers.

However, a resiliently deformable membrane may be associated with each end face of the damper, so as to define two auxiliary chambers disposed respectively on each side of the stator and rotor.

In both cases, an end face associated with the membrane is formed of a first crown associated with the stator and a second crown associated with the rotor, the communication passage between the first main chamber and the auxiliary chamber being formed by a clearance provided between these crowns. The membrane has advantageously an annular shape and its internal and external annular peripheries are surrounded respectively by an inner ring and an outer ring, to which the membrane is fixed by vulcanization. Such a membrane surrounded by its inner and outer rings, may be advantageously housed in a corresponding annular groove defined by the two crowns of the corresponding end face. In this latter case, the inner and outer rings of a membrane are preferably adhered to the facing walls of a groove.

The resiliently deformable membrane may be an elastomer membrane or may be formed by alternately disposed layers of elastomer and metal layers. In this latter case, the layers are advantageously disposed parallel to the axis of rotation of the rotor and of the stator.

In such a rotation damper, the damping is provided by laminating the hydraulic fluid, which is preferably a high viscosity silicon oil, between the ends of the vanes and the facing cylindrical wall, when the rotor is rotated with respect to the stator about their common axis, in a mode of operation which is well known and described not only in the above mentioned French patent but also in French Pat. No. 2 356 347.

Finally, it should be noted that the French patent application No. 85 19418 proposes the application of the rotation damper which forms the subject matter thereof to a vehicle suspension as well as to a manual control comprising a control handle fixed to a shaft and whose angular movement is representative of an output signal driving a member, for example an aircraft flight control, for orientating by means of an electric jack the front bogie of the tricycle landing gear of a helicopter.

The present invention provides then an improvement to variable pitch rotors and rotor hubs, particularly for helicopters, of the type described in the French Pat. Nos. 2 397 325 and 2 397 327 of the applicant, by improving the structure of the combined bearing devices with which they are equipped so as to reduce the power required for controlling the angle of attack of the blades.

Another object of the invention is to improve the combined bearing devices of rotors and rotor hubs of the above type, so that they provide damping of the angular oscillations of the blades under drag conditions which is sufficient, in all the different cases of application envisaged for low or medium tonnage helicopters.

Yet another object of the invention is to provide an improved combined bearing device, having a new type damper for damping the angular oscillations of the blades under drag conditions and which, with respect to a conventional visco-elastic damper such as known from French Pats. Nos. 2 397 325 and 2 397 327 has the main advantage of dissociating, in the same member, the stiffening function (and so the resilient return which is all the higher the greater the stiffness) and damping function, which facilitates the optimization of each of these functions.

SUMMARY OF THE INVENTION

For this, the combined bearing device of the invention, for equipping variable pitch rotors of the type known from French Pat. No. 2 397 327, comprises, as is also known from the last French patent mentioned, a spherical ball joint articulation centered on the axis of the corresponding flexible arm of the rotor and including at least one element made from a visco-elastic material with high deformation remanence, substantially in the form of a spherical skull cap portion, which is retained by a first annular rigid support intended to be fixed to the correspoding rigid tubular sleeve of the rotor, so that the spherical ball joint articulation allows, about its center, a relative freedom of movement of the corresponding blade of the rotor under flapping and drag conditions, by shearing of the visco-elastic material which also provides resilient return of the blade under flapping and drag conditions, as well as damping of the angular oscillations of the dragging and flapping blade, and it also includes a plain cylindrical bearing for angle of attack articulation and embedment in the hub, which is connected to a second rigid support of the spherical ball joint articulation, substantially concentric to the first support thereof, and not intended to be fixed to the sleeve, so that the visco-elastic material element or elements are retained between the two supports, the plain cylindrical bearing being mounted concentrically to the spherical ball joint articulation and radially in series therewith with respect to the axis of the flexible arm.

Thus, changing the angle of attack of the blades is obtained by torsion of the flexible connecting arm without having to subject the visco-elastic element or elements of the spherical ball joint articulation to shearing forces, because this latter may rotate about the flexible arm axis because of the presence of the plain cylindrical bearing, which very substantially reduces the power which must be transmitted by the members for controlling the pitch change of the blades. Another result is that the visco-elastic material element or elements may be dimensioned so as to provide suitable resilient return of the blade under flapping and drag conditions, for the values of the flapping and drag stiffnesses as well as the ratio of these stiffnesses are adjusted by choosing the thickness, the distribution and hardness of the visco-elastic material, preferably an elastomer, which performs very well from the mechanical characteristic point of view.

The same goes for damping the angular oscillations of the dragging blade, which may be provided to a sufficient extent, on rear rotors of helicopters of low tonnage, by the visco-elastic material element or elements of the spherical ball joint articulation, because of the remanence force of the material used, namely a high hysteresis elastomer.

In the combined bearing device of the invention, the spherical ball joint articulation is advantageously mounted for free translational movement with limited axial clearance parallel to the axis of the plain cylindrical bearing so as to allow axial movements of the oscillation and damping element or elements, which is favorable to absorption of the centrifugal force and allows assembly tolerances to be compensated for.

In the case where, as in French Pat. No. 2 397 325, the combined bearing device is intended to be fixed to the corresponding sleeve by that one of the two annular rigid supports which is in an external radial position on the spherical ball joint articulation, the device of the invention is further characterized in that the other rigid support, in an internal radial position, of the spherical ball joint articulation is connected to the plain cylindrical bearing, which is a dry bearing surrounded by the spherical ball joint articulation and has a cylindrical sleeve for fixing to the hub and about which the internal rigid support is journalled by means of at least two self lubricating rings spaced from each other along the axis of the sleeve and each housed in an annular holding groove formed in the inner radial face of the internal rigid support. The angle of attack articulation formed by this dry bearing has the advantage of simultaneously making possible good embedment in the hub and providing the axial translational freedom required for allowing the movements of the oscillation and damping element or elements.

In order to facilitate assembly and taking up play at the level of the plain cylindrical bearing, each self lubricating ring is formed advantageously of two half rings each having a semicylindrical shape and which are housed in the same annular holding groove.

Advantageously, the combined bearing device of the invention also includes a device for automatically taking up the play of the plain cylindrical bearing; and in a preferred embodiment, this automatic play take up device is a hydraulic device having at least one compensation chamber filled with a hydraulic fluid pressurized by at least one pressurization mechanism and in communication with each of the annular holding grooves, between the corresponding ring and the bottom of the groove, by at least one duct, so that the play is taken up by diametrical movement of the rings under the action of the pressure of the hydraulic fluid in each compensation chamber.

To provide sealing of the hydraulic automatic play take up device, each ring is advantageously connected sealingly to each of the two lateral faces of the annular groove in which it is housed by means for a flexible annular seal, preferably elastically deformable. In an advantageously simple embodiment, each ring is engaged in a flexible and annular seal having a U cross section housing the corresponding holding groove, to the lateral faces of which the wings of the U seal are secured, whereas the base of the U seal, between the ring and the bottom of the groove, is not secured to this groove bottom into which at least one duct opens for communicating with at least one hydraulic compensation chamber.

Similarly, in order to provide sealing in the circumferential direction, between the two half rings housed in each holding groove, each half ring is connected by both ends to both ends of the other half ring by two flexible connections, preferably elastically deformable, and, in this case, each of the two flexible connections is secured to the U seal, whose wings it connects together.

Such a construction of seals and flexible connections, advantageously in the form of elements made from a visco-elastic material, such as an elastomer, and preferably the same as that of the visco-elastic element or elements of the spherical ball joint articulation, provide not only sealing but also partition off the annular play of the friction rings of the plain cylindrical bearing while making possible their diametical degree of freedom.

In the automatic play take up device, the mechanism for pressurizing the hydraulic fluid of each compensation chamber includes, in a particularly simple embodiment, at least one flexible membrane, preferably elastically deformable, which is advantageously a sealed bladder housed in the corresponding compensation chamber and inflatable by a gas supply valve which is accessible from outside the bearing.

In an advantageous embodiment from the compactness and weight points of view, the hydraulic play take up device is at least partially integrated in the spherical ball joint articulation, at least one hydraulic compensation chamber being defined at least partially between the internal and external rigid supports and/or in a recess of one at least of the rigid supports of the spherical ball-joint, and the compensation chamber is sealed by at least one visco-elastic material element of the spherical ball-joint.

In one embodiment of great simplicity, which may possibly be without a hydraulic device for automatically taking up the play of the plain cylindrical bearing, the spherical ball-joint advantageously comprises a single visco-elastic material element, which is a strip of high hysteresis elastomer, in the form of a spherical skull cap adhered by its internal and external radial faces, respectively concave and convex, to the respectively external convex and internal concave radial faces of the respectively internal and external rigid supports, and the plain cylindrical bearing sleeve has an internal radial flange for bolting to an external radial flange of a sleeve for fixing the root of the corresponding flexible arm to the hub.

However, in a preferred variant, which is particularly advantageous when damping of the oscillatory movements of the dragging blade cannot be provided sufficiently by the visco-elastic elements of the spherical ball-joint the combined bearing device of the invention further includes a hydraulic damper for damping the angular oscillations of the blade under drag conditions, which is associated with the spherical ball joint.

It is then advantageous for the hydraulic damper to be a rotation damper, mounted in radial series with the plain cylindrical bearing, with respect to the axis of the latter, this hydraulic rotation damper being of the type with coaxial stator and rotor defining therebetween at least one internal damping chamber filled with a hydraulic fluid, such as a high viscosity silicon oil, and at least one vane fixed to the rotor or the stator and subdividing the internal chamber into two damping chambers connected together by laminating means, so that any relative rotational movement of the rotor and the stator about their common axis causes rotation of the vane in the internal chamber, while compressing one of the two damping chambers and causing an expansion in the other one, thus providing damping of the rotational movement by lamination through means for laminating the fluid flowing from the compressed damping chamber to the expanded damping chamber, the stator being secured to the rigid support of the spherical ball-joint which is connected to the plain cylindrical bearing, and the rotor being secured to the rigid support of the spherical ball-joint which is intended to be fixed to the corresponding tubular sleeve. In such a bearing device, the laminating means may be advantageously associated with a vane and, in particular, these laminating means may be simply formed by a narrow passage defined between the free end of the vane carried by the rotor or the stator and a facing surface on the stator or the rotor.

In addition, each internal chamber of the damper may be advantageously sealed by at least one visco-elastic material member connecting the rotor to the stator while providing, with internal damping, resilient return towards the initial position of the rotor with respect to the stator.

Preferably, each internal chamber of the hydraulic rotation damper is connected by a communication passage to at least one chamber for compensating the expansions of the hydraulic fluid, which is pressurized by a pressurization mechanism providing static pressurization of the damper.

In an advantageously simple embodiment, the pressurization mechanism includes at least one flexible member, preferably elastically deformable, which defines at least partially the corresponding expansion compensation chamber. Preferably, this flexible membrane of the pressurization mechanism is a sealed bladder, housed in the corresponding expansions compensation chamber and inflatable by means of a gas supply valve accessible from outside the bearing.

Advantageously, the communication passage or passages between an expansion compensation chamber and an internal chamber of the damper is or are calibrated so as to form a dynamic filter for the operating frequencies of the damper.

In the embodiment of the combined bearing device including a hydraulic rotation damper with expansion compensation chamber, it is advantageous for each expansion compensation chamber and its pressurization mechanism, preferably comprising an inflatable bladder, to form simultaneously and respectively a compensation chamber for the hydraulic play take-up device of the plain cylindrical bearing and its pressurization mechanism preferably including an inflatable bladder.

In this latter case, it is also advantageous for the duct or ducts connecting the compensation chamber to a groove holding a ring of the plain cylindrical bearing is or are calibrated so as to form also a dynamic filter for the operating frequencies of the damper.

In order to improve the compactness of the device, it is advantageous for sealing of each chamber for compensating the expansion of the fluid of the hydraulic damper to be provided, at least partially, by at least one visco-elastic material element of the spherical ball-joint. This is particularly the case when the compensation chamber belongs simultaneously to the rotation damper and to the automatic play take-up device, when this latter is at least partially integrated in the spherical ball-joint.

Generally, it is also very advantageous for the hydraulic damper to be at least partially integrated in the spherical ball joint articulation, at least one internal chamber of the damper then being defined at least partially between the rigid internal and external supports and/or in a recess inone at least of the rigid supports of the spherical ball joint.

In this latter case, and in accordance with a particularly advantageous embodiment, from the points of view of simplicity, weight and the small number of components, the stator, the rotor, and at least one visco-elastic material member which joins them together within the hydraulic rotation damper, are formed respectively by the internal rigid support, the external rigid support and at least one visco-elastic material element of the spherical ball-joint. Thus, an integrated angle of attack bearing is obtained, with a spherical resilient flapping and drag return ball joint and with hydro-elastic drag damping.

In a preferred embodiment, the hydraulic rotation damper comprises two radial laminating vanes symmetrical with each other with respect to the axis of the plain cylindrical bearing and to the flapping plane of the corresponding blade, the two vanes being secured to the internal support of the spherical ball-joint and each extending, perpendicular to the drag plane and symmetrically above and below this plane, into one of two chambers each defined by a recess extending radially and in the circumferential direction in the external rigid support, by a part of the external radial surface of the internal rigid support which is facing the corresponding recess of the external support and about the foot of the vane engaged in this recess, and by annular surface portions of the visco-elastic material element or elements connecting the two rigid supports to each other.

Similarly, this device includes two hydraulic compensation chambers, symmetrical with each other with respect to the axis of the plain cylindrical bearing and with respect to the drag plane of the corresponding blade, each compensation chamber being defined by one of two recesses extending radially in the circumferential direction in the external rigid support, in positions alternating with the recesses of the damping chambers in the circumferential direction, each compensation chamber being also defined by a part of the external radial surface of the internal rigid support opposite the corresponding recess and by annular surface portions of the visco-elastic material element or elements connecting the two rigid supports together, at least one compensation chamber being connected to each holding groove of a ring of the plain cylindrical bearing by a duct, preferably calibrated, which passes through the internal rigid support.

In addition, the recesses of the vane housing and/or compensation chambers are advantageously closed radially externally by an external jacket sealingly and removably mounted on the periphery of the internal rigid support.

In this case, it is advantageous for the passage or passages, preferably calibrated, for communication between an internal damping chamber and a compensation chamber is or are defined by a radial clearance between the external jacket and the external rigid support.

Again advantageously, each internal damping chamber is separated from each of the compensation chambers between which it is situated in the circumferential direction by a solid elastomer stud, integral with the visco-elastic element or elements connecting the two rigid supports together. The visco-electric element or elements of the spherical ball joints advantageously comprise two annular strips in the form of a spherical skull cap bonded laterally to the two rigid supports and to each other, and each of a maximum width at the levels of the recesses housing the vanes. In addition, these annular visco-elastic strips are preferably of a minimum width at the level of the recesses of the compensation chambers.

To facilitate assembly, each laminating vane is advantageously removably fixed on the external radial surface portion of the internal support which forms the bottom of a corresponding recess, and this removable fixing is provided, in a simple embodiment, for each vane on the internal support by means of at least one screw engaged radially from the inside in a recess formed in the internal radial face of the internal support, between two cylindrical bearing surfaces in each of which is formed one of the grooves for holding a ring of the plain cylindrical bearing.

Furthermore, the external rigid support is advantageously formed with at least two axial passages each opening into an internal damping chamber and in one of which is fitted a hydraulic fluid filling valve, which is accessible from the outside, preferably on the same side as the connection to the rigid tubular sleeve whereas a drain valve is fitted in another of the axial passages and is accessible from the outside, preferably on the side intended to be turned towards the hub, the external rigid support being further formed with two other substantially axial passages each opening into a compensation chamber, and in each of which an inflation valve is fitted, accessible from the outside, preferably on the same side as the connection to the sleeve.

The invention also provides a variable pitch rotor for rotorcraft, usable as the main rotor or as rear rotor for helicopters, and including a rotor hub driven in rotation about an axis of rotation of the rotor by a rotor mast, blades, each of which is retained on the hub by means of an elongate arm, substantially radial with respect to the axis of the rotor, rigid in the longitudinal direction against the centrifugal force and flexible under flexible and torsion conditions for allowing the flapping and drag movements and variations of the pitch of the corresponding blade, and is surrounded without contact, as far as the vicinity of the hub, by a tubular sleeve rigid under torsion and flexion forces urged externally by a lever controlling the pitch of the corresponding blade, and whose end the nearest to the rotor axis is connected to the hub by a combined angle of attack bearing device, with resilient return of the corresponding blade under flapping and drag conditions, and with incorporated damping of the angular oscillations of the blade under drag conditions, which surrounds the root of the corresponding flexible arm on the hub, and which includes a spherical ball joint articulation centered on the axis of the flexible arm and having at least one visco-elastic material element with high deformation remanence, subtantially in the form of a spherical skull cap portion which is retained between two rigid supports, one of which is of annular shape and is secured to the sleeve and the other of which is connected to the hub, so that the spherical ball joint articulation allows, about its center, a relative freedom of movement of the blade under flapping and drag conditions, by shearing of the visco-elastic material, which provides resilient return of the blade under flapping and drag conditions, as well as damping of the angular oscillations of the blade under drag conditions, and the rotor of the invention is characterized in that the combined bearing device is, for each blade, a devine such as described above and proper to the invention.

It is possible for the internal end of the sleeve to be secured to the combined bearing device by screwing a substantially radial external flange carried by the sleeve to the external rigid support of the bearing device. In this case, the substantially radial external flange is advantageously bent back about the external support of the bearing device and a single piece with fitted socket and is held in the tubular internal end of the sleeve, made preferaby from a composite material, and in the extension of a profiled shell of the corresponding blade. Similarly, it is possible for the external end of the sleeve to be connected to the internal end of the profiled shell of the blade by screwing against the sleeve an external radial flange of a socket fitted and retained in the tubular internal end of the profiled shell of the blade.

In an advantageously simple embodiment, with low aerodynamic drag, and having a limited number of parts, the hub includes a tubular central body, coaxial with the rotor shaft, and radial extensions, with respect to the axis of the rotor, and in number equal to the number of blades, for connecting these latter to the hub. In a first variant, the hub may be secured to the rotor shaft by bolting, against an end flange of the shaft which is radial with respect to its axis, the part of the radial extensions which is turned towards the rotor shaft. However, in another variant preferred for constructing rear rotors, the radial extensions and the tubular body of the hub are formed in a single piece with the end of the rotor shaft.

In these different cases, in order to provide good connection of flexible arms to the hub, each flexible arm is advantageously extended towards the rotor axis, beyond the center of the corresponding combined bearing device, by a root part, possibly thickened, by which the arm is fixed to a radial extension of the hub.

In a first embodiment, the root part of the flexible arm is retained in a sleeve with external radial flange bolted to an internal radial flange of the sleeve of the plain cylindrical bearing, the sleeve being itself retained in a radial extension of the hub by at least one pin with axis substantially parallel to the axis of the rotor and passing through coinciding bores in the root part, the sleeve and the radial extension. But, in another example the sleeve of the plain cylindrical bearing is fitted on or integrated in a tubular and cylindrical radial extension of the hub, in which the root part of the flexible arm is retained by a diametrical pin whose axis is substantially in the plane of rotation of the rotor.

In the particular case of an antitorque rotor, whose tubular hub body is connected for rotation, through internal splines, to a first tubular shaft section, with external splines, which slides axially in the hub body and whose end, on the side opposite the rotor shaft, projects from the hub body and is secured to a plate controlling the radial arms in number equal to the number of blades and on each of which is articulated an end of a pitch control lever, whose other end drives the sleeve, the control plate being connected by a ball thrust bearing to a non rotary control shaft, coaxial with the rotor shaft and with the first tubular shaft section, and mounted for axially sliding in this latter, this antitorque rotor is advantageously such that the hub includes a second tubular shaft section, engaged coaxially in the hub body, to which it is secured by screwing an external radial flange of this second section against an end of the hub body, the internal lines being presented inside the second tubular shaft section through which the first tubular shaft section passes.

Still in the case of an antitorque rotor, it is advantageous for the internal end of the longitudinal member of the blade to be in the form of a fork between the two brabches of which is engaged the external end, preferably surrounded by a protective socket, of the flexible arm connected to the longitudinal member of the blade by a removable pin with axis perpendicular to the longitudinal axis common to the longitudinal member and to the flexible arm and extending in the plane of rotation of the rotor.

On the other hand, in the case of a main helicopter rotor, whose rotor mast carries a low stop for flapping of the blades at low speeds or zero speed of the rotor, of the reciprocal ring type, cooperating with a low stop integral with each blade, this rotor is a advantageously such that the low stop of each blade is formed by a lower heel of the external support of the combined bearing device or, advantageously of the external jacket of this external support.

In the case also of a main rotor, it is further advantageous for the external end part, preferably thickened, of the flexible arm and the external substantially cylindrical end of the tubular essentially truncted cone shaped sleeve, to be connected by at least one pin perpendicular to the plane of rotation of the rotor to an internal radial fork joint of a connecting piece shaped as a double external radial fork joint and connected to the foot of the corresponding blade by two pins perpendicular to the plane of rotation of the rotor and one of which is removable so as to allow rotation of the blade about the other one forming a pivot with respect to the flexible arm and the corresponding sleeve.

Finally, in these different cases, the pitch control lever may be advantageously articulated in a forkjoint fixed to a lateral heel of the external rigid support of the combined bearing device or its external jacket.

BRIEF DESCRIPTION OF THE DRAWINGS

The invention will be better understood and other advantages and characteristics of the invention will be clear from reading the following description of several examples given by way of non-limitative examples, with reference to the accompanying drawings in which:

FIG. 4 is a sectional view through IV—IV of FIGS. 3 and 5, FIG. 5 is a sectional view through V-V of FIG. 4, FIG. 8 is a schematical cross sectional view through VIII—VIII of FIG. 9 relative to the hydraulic automatic play take-up device equipping the device of FIGS. 3 to 7, FIG. 9 is a schematic sectional view through IX—IX of FIG. 8, FIG. 10 is a schematical and partial view showing a detail of FIG. 9, FIGS. 11a and 11b are views representing partially in a top view and partially in section through the plane of rotation of the rotor respectively of the central part and of a directly adjacent part of a three blade helicopter antitorque rotor, FIGS. 12a. and 12b show in axial section the same parts as FIGS. 11a and 11b.

DESCRIPTION OF THE PREFERRED EMBODIMENTS

Figure 1:
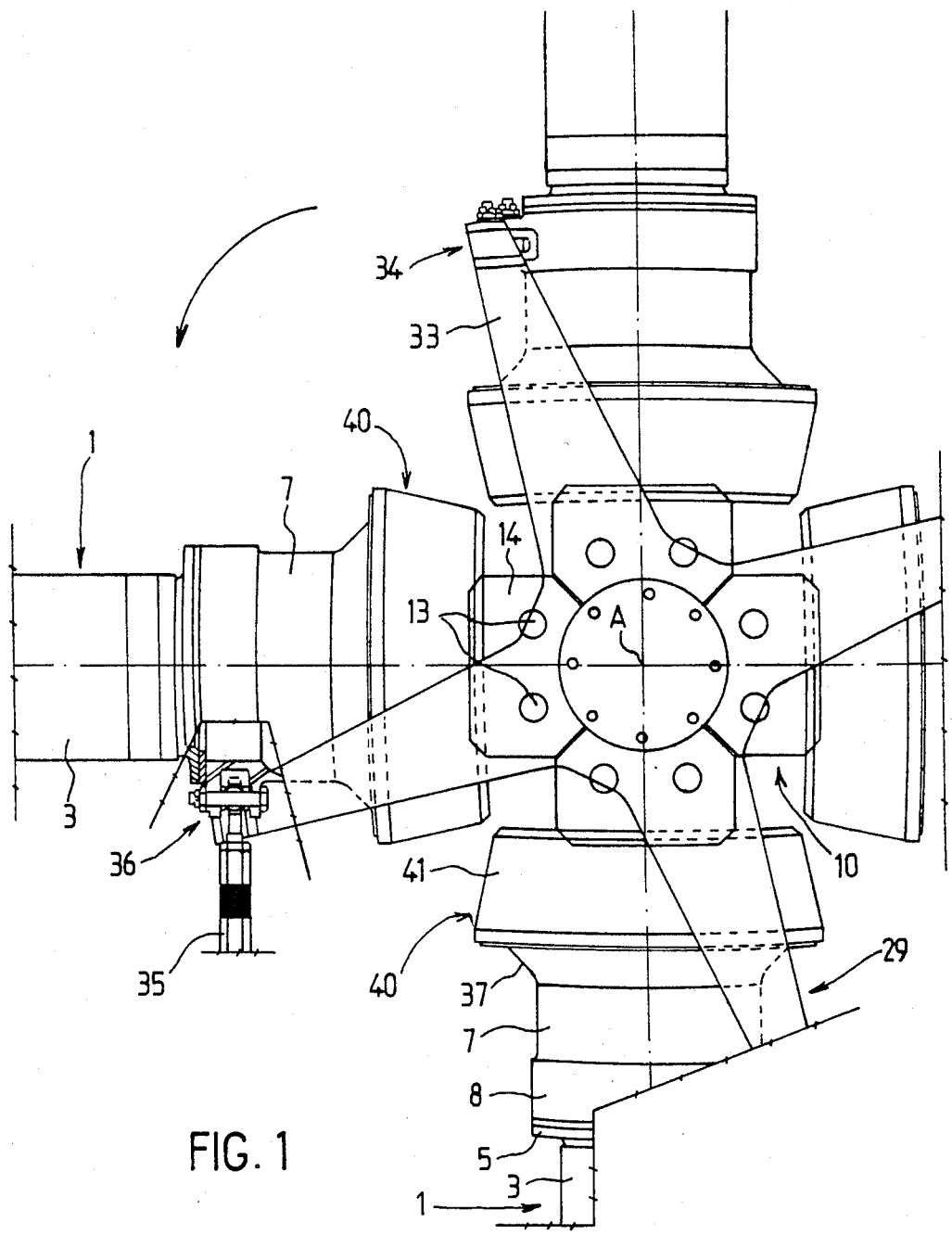
FIG. 1 is a schematical top view of the central part of a four bladed antitorque rotor of a helicopter.
Figure 2:
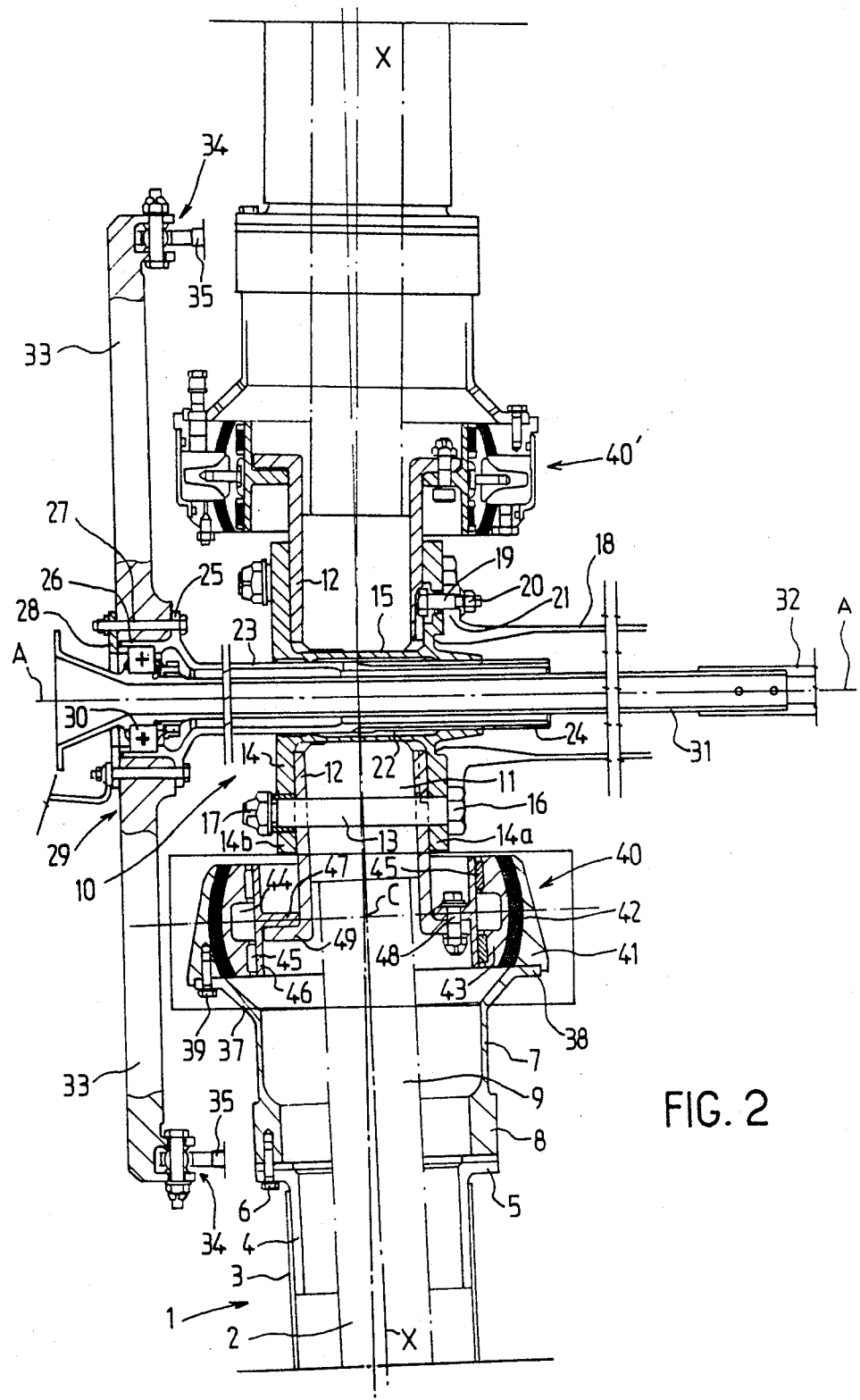
FIG. 2 is a schematical axial sectional view of the rotor of FIG. 1, a first simplified variant of which, for low tonnage helicopters, is shown in the lower half section (below the horizontal median axis of the fig.), whereas a second variant, preferred for a medium tonnage helicopter, is shown in the upper half section (above the horizontal median axis)

Referring to FIG. 1 and to the lower half of FIG. 2, the rear rotor has four blades 1, each of which is formed essentially by a tie rod 2 surrounded by a profiled shell 3. The internal end (the closest to the axis of rotation A of the rotor) of shell 3 is tubular and is fixed to a socket 4 which is fitted into shell 3 and whose internal end is shaped as an annular flange 5, substantially radial with respect to the longitudinal axis X—X of tie rod 2. By means of this flange 5, shell 3 of blade 1 is fixed by substantially axial screws, such as 6, in the thickened external end 8 of a rigid and tubular stub sleeve 7 which surrounds without contacting it a flexible arm 9, which is formed as single piece with the tie rod 2 of blade 1 and extends it towards the axis A of the rotor, beyond the blade foot formed at the level of socket 4, at the internal end of shell 3.

The flexible arm 9 which, as will be described below, retains blade 1 on hub 10 of the rotor, against the centrifugal forces, is a flexible and torsible element essentially formed, for example, by a longitudinal bundle of synthetic or mineral (metal) fibers or threads, possibly braided, individually coated with a synthetic resin and agglomerated together by an elastomer, so that this flexible arm 9 without appreciable deformation transmits the axial centrifugal foces from blade 1 and by flexing allows the flapping and drag conditions, and, by torsion, the variations of the angle of attack of said blade 1.

The internal end of the flexible arm 9, shaped as a thickened root portion 11, is fitted and retained in a metal sleeve 12 by two points 13, parallel to the axis A of the rotor, and passing through coinciding bores formed not only in root 11 and in sleeve 12, but also in a tubular and radial (with respect to the axis A) extension 14 formed as a single piece with a central and tubular hub body 15 which is made from metal. Hub 10 includes a number of tubular extensions 14 in number equal to blades 1, and in each of which the two corresponding pins 13 retain the assembly of root 11 and sleeve 12 radially in position with respect to axis A. Each pin 13 is formed by the shank of a bolt 16 whose head is applied against the internal axial part 14a of the tubular extension 14 and with threaded shank end projecting beyond the external axial part 14b of this same tubular extension 14 and on which is screwed a pinned stop nut 17.

The hub body 15 and its radial extensions are secured for rotation to a mast or rotor shaft 18, which is tubular and coaxial (about axis A), by means of a ring of bolt 19-nut 20 assemblies which fix the internal axis parts 14a against the radial flange 21 of the thickened end of the rotor shaft 18. The tubular central body 15 of hub 10 has, over a part of its length, internal axial splines 22 by means of which this tubular body 15 engages with external axial splines 24 extending over the internal axial part of a tubular shaft section 23 thus mounted for axial sliding in the hub body 15 while being secured for rotation therewith.

The external axial end (on the side opposite the rotor shaft 18, of the tubular shaft section 23 is widened out and formed as an external radial flange 25 and as an axial collar 26 making possible, on the one hand, fixing by means of a bolt-nut assemblies 27 and an external counter bearing ring 28, of a coaxial control plate 29 on the shaft section 23, and, on the other hand, axial locking on the shaft section 23 of the external ring of a ball thrust bearing 30, whose internal ring is axially locked on the external axial end of a coaxial central control shaft 31, mounted for axial sliding inside the tubular shaft section 23 and whose internal axial end is connected to a mechanism 32 for linearly driving the device for controlling the pitch change of the blades of the rear rotor. The control plate 29 is a plate in the form of a cross with four radial arms 33, in which the external radial end of each one is formed as an articulation fork by a swivelling connection 34 of one end of a link 35 for controlling the pitch of a blade 1, the other end of link 35 being also articulated by a swivelling connection 36 in a fork projecting laterally from the thickened external end 8 of the corresponding stop sleeve 7 (see FIG. 1).

The rear rotor structure described up to now is relatively well known and allows the pitch of all the blades 1 to be changed simultaneously in the following way: when the non rotary control shaft 21 is driven in translation axially by mechanism 32, it also drives in axial translation, through the ball thrust bearing 30, the control plate 39 as well as the tubular shaft section 23? which are simultaneously driven in rotation about axis 1 about hub body 15 and the rotor shaft 18. Axial movement of plate 29 and its arms 33 exerts a tractive or compression force on the control links 35, which urge the stub sleeves 7 outwardly in rotation about the longitudinal axes X—X of blades 1, which, through torsion of the flexible arms 9, causes the simultaneous variation of the angle of attack of blades 1. Simultaneously, when the rotor turns, blades 1 are sujbected to flapping and drag movements and to angular drag movements, which the flexible arms 9 make possible.

In this rotor, control of the change of pitch of blades 1 is facilitated, blades 1 are resiliently returned under flapping and drag conditions, and their angular movements under drag conditions are damped by combined bearing devices 40, which are bearings for retaining the internal ends 37 of the rigid stub sleeves 7 on hub 10, and which form more particularly the subject matter of the invention.

Up to this point of the description, the axial or internal or external radial positions have been generally described with reference to the axis A of the rotor. For the description of the combined bearing devices, the axial or internal or external radial positions will in general be indicated below by referring to the longitudinal axis X—X common to a blade 1 and to its flexible arm 9.

In the embodiment shown in the lower half of FIG. 2, each bearing device 40 is fixed, by axial bolts 39, to the external radial flange 38 carried by the internal axial end 37 of the corresponding stub sleeve 7. These bolts 39 are retained in a rigid external radial support, or external frame 41, whose general external shape is substantially in the form of a truncated cone converging towards axis A, of the combined bearing 40. This external annular and metal frame 41 has a concave internal radial face in the form of a spherical skull cap portion, by which the external frame 41 is adhered, for example by vulcanization, to the convex external radial face, having a corresponding curvature, of an annular strip 42, of a viscoelastic material with high deformation remanence, for example a high hysteresis elastomer. By its internal radial face, concave and also in the form of a spherical skull cap portion, the elastomer strip 42 is also bonded to the external radial face, convex and with corresponding curvature, of an internal radial rigid support 43 or internal frame. This annular and metal internal frame 43 has an internal radial face on which two cylindrical axial end bearing surfaces are separated from each other by a central recess 44. In each of the cylindrical axial end bearing surfaces, an annular groove has been formed for housing a self lubricating ring 45. By means of these two rings 45, each held in position in its groove, the assembly formed of the two frames 41 and 43 and the elastomer strip 42, which is arranged as a spherical ball-joint centered on the axis X—X of the corresponding arm 9 is journaled about a smooth cylindrical sleeve 46 having an internal radial flange 47 by which this sleeve 46 is fixed by means of bolt-nut assemblies 48 to an external radial flange 49 of the external axial end of the sleeve 12 connecting the hub 10.

The combined bearing device 40, thus making it possible to support the internal axial end of stub sleeve 7 on hub 10 has, on the one hand, a cylindrical pitch articulation, in the form of a plain cylindrical angle of attack bearing having the two self lubricating rings 45 mounted in the internal annular frame 43 and rotating on and about the cylindrical sleeve 46 fixed to hub 10 and, on the other hand, and in radial series and concentrically, a spherical flapping and drag articulation, subjecting the visco-elastic material strip 42 to shearing forces. This strip 42, by this deformation under shearing, thus provides relative freedom of flapping and drag movement of blade 1 about the center of the spherical ball-joint thus formed, while providing a resilient return and, for the angular drag movements, damping by the effect of the remanence of the material used, in this case a high hysteresis elastomer. It should be noted that the articulation with plain cylindrical angle of attack bearing also allows the combined bearing device 40 to be embedded in hub 10, through sleeve 46.

Thus a plain cylindrical angle of attack bearing device is obtained, combined with a spherical return and visco-elastic damping stop.

In the case where damping of the angular drag movements of the blade introduced by the visco-elastic strip 42 of this combined bearing is judged insufficient, the construction shown in the upper half of FIG. 2 is then used.

In an identical space, with exactly the same arrangement with respect to the other members of the rotor and the same connections, on the one hand, to stub sleeve 7 and on the other to hub 10 through sleeve 12, the combined bearing device 40' of the upper half of FIG. 2 is essentially distinguished from that described above by the incorporation, in the spherical ball-joint, of a hydraulic rotation damper comprising vanes, so that the assembly forms a plain cylindrical angle of attack bearing with embedment in the hub combined with a spherical ball-joint for resilient return under flapping and drag conditions and with an internal hydro-elastic damper of the angular drag oscillations of the corresponding blade.

This combined bearing device 40' is described below with reference also to FIGS. 3 to 7.

We find again an internal frame 53 of the sperhical ball-joint, whose internal radial face has, on each side of a central annular recess 54, a cylindrical bearing surface in which has been formed an annular groove for holding in position a ring 45 formed of two substantially semicylindrical parts 55a and 55b, which are each attached to the two side walls of the corresponding groove by annular seals 56, injected in the same elastomer as that of the spherical ball-joint, and connected together by connections 57 filling up the circumferential gap between the facing ends of the two half rings 55a and 55b of each ring 55. The two annular seals 5 and the two connections 57 received in the same groove form a single element bonded on the one hand to the side walls of the corresponding groove and on the other to the side and end walls of the two half rings 55a and 55b (see FIGS. 4, 6 and 7). Rings 55 are made from appropriate materials so as to form a dry self lubricating bearing. A composite material may for example be used having carbon fibers dispersed haphazardly in a resin such as a polyimide resin. An appropriate material for this is that sold under the commercial name of "Kinel".

Rings 55 and the internal frame 53 thus form the angle of attack articulation formed of a dry cylindrical bearing embedded in the smooth sleeve 46 connected to hub 10 and free in translation with sufficient play so as to allow the axial movements of the spherical ball-joint and of the damper which it contains, and which are necessary considering the centrifugal force acting on the assembly under operation, and assembly tolerances.

The external radial surface of the internal frame 53 has two annular and convex axial end parts, which are in the form of spherical skull cap portions centered at C on the axis X—X of the cylindrical bearing, coaxial with the corresponding flexible arm 9, and these spherical bearing surfaces, against which are bonded two annular lateral strips 52 of the elastomer spherical ball-joint, are separated by an annular recess 53'. In the external frame 51 of the spherical ball-joint which is also fixed to the radial flange 38 at the internal end 37 of stub sleeve 7 by bolts 39, four recesses extending radially and in a circumferential direction are formed so as to open into the external radial face of frame 51 as in its internal radial face, opposite the peripheral recess 53' of the internal frame 53. Laterally, on each side of these four housings centered in the same radial and median plane of the device, the external frame 51 has, on its internal radial face, two concave annular bearing surfaces, in the form of spherical skull cap pions, which are bonded to the elastomer strips 52 so as to complete the spherical resilient return ball-joints. The four housings are arranged in two pairs of two identical and substantially diametrically opposite housings for each pair, but different from one pair to another, the two housings of one pair being interfitted with the two housings of the other in the circumferential direction. The four housings have the same width (parallel to the axis X—X) but two of them 58, symmetrical with one another with respect to the center C of the spherical ball joint and with respect to the flapping plane BB, each extend over an angular sector subtended by an angle at the center larger than that of the angular sector over which extends each of the other two housings 59, symmetrical with each other with respect to the center C and with respect to the drag plane TT of the corresponding blade.

In each of the two largest housings 58 is housed a bent metal vane 60 inserted into the external armature 51 radially from the outside to the inside, so that its foot is engaged in the recess 53' forming the bottom of the corresponding housing, and so that the vane 60 is held in position in housing 53 by three bolts 61 screwed radially from the inside towards the outside from recess 54, through the internal frame 53 and into vane 60. The dimensions of vanes 60 are such that their free end is only separated by a small gap from the cylindrical internal radial surface of an external jacket 62, which is removably and sealingly mounted on the periphery of the external frame 51, so as to seal housings 58 and 59. These latter are separated from each other in the circumferential direction by external frame 51 portions (in the external radial position) as well as by solid elastomer studs or blocks 62 (in the internal radial position) which are each integral with the annular elastomer strips 52, which they join together. These latter have a maximum width at the level of the two large housings 58 and a minimum width at the level of the small housings 59 (see FIGS. 4 and 6) and they seal off these housings 58 and 59 between the two frames 51 and 53, while allowing a relative rotation of these latter about the center C of the spherical ball-joint while imparting thereto a force returning them resiliently to their initial position.

Before the closure of housings 58 and 59 by positioning the external jacket 62, which is retained by bolts 64, screwed into the external frame portions 51 radially outwardly of the elastomer block 63 so that a calibrated radial clearance (65) (see FIG. 5) is provided between the external jacket 62 and these external frame portions 51, a sealed and inflatable rubber bladder 66, having a small inflation tube 67, is disposed in each small housing 59, and its inflation tube 67 is engaged from the inside in a lateral bore 68 formed in the axial direction in the part of frame 51 which is connected to the stub sleeve 7, this tube 67 being sealingly connected to a pneumatic inflation vane 69 fitted in the outlet of bore 68 and accessible from the outside (see FIGS. 4 and 6) from the stub sleve 7 side.

Similarly, each of the large housings 58 (See FIG. 4) is in communication with the outside through two lateral bores formed in the axial direction, one of them 70, in the part of the external frame 51 by which this latter is fixed to the stub sleeve 7, being sealingly connected to a hydraulic filling valve 71 mounted on this frame part 51 and accessible from the outside on the stub sleeve side, and another bore 72, in the armature part 51 on the hub 10 side, being sealingly connected to a drain valve 73, accessible from the outside on the hub 10 side. One of the large housings 58 (at the bottom of FIG. 4 is in communication with the outside through another lateral bore 74, formed in the frame part 51 on the hub 10 side, and which is sealingly closed, in service, by a removable drain screw 75, accessible from the outside on the hub 10 side.

Through the filling valve 71, the housings 58 and 59 and the calibrated passages 65 which connect them together are filled with a high viscosity silicon oil and, through the pneumatic inflation valve 69 the bladders 66 are inflated, which results in a static pressurization of the hydraulic assembly thus obtained, which forms a rotary rotation damper. The stator of this latter is formed by the internal frame 53, embedded in hub 10, and has two laminating vanes 60 which are each engaged in an internal damping chamber defined in the rotor, formed by the external frame 51 connected by the stub sleeve 7 to the corresponding blade, by the corresponding large housing 58, by the portion opposite the external radial surface of the stator 53 which surrounds the foot of the corresponding vane 60 and by the portion opposite the external jacket 62. Each vane 60 subdivides the internal damping chamber 58 which receives it into two damping chambers 58a and 58b, one of which increases in volume and is compressed and the other of which decreases in volume and is expanded, when the rotor 51 rotates, with respect to stator 53, about the center C of the spherical ball joint, by shearing the elastomer 52-63 because of an angular movement of the corresponding blade under drag conditions. These correlative increases and decreases of the volumes of the damping chambers 58a and 58b force oil from the compressed chamber, with decreasing volume, towards the expanding chamber, with increasing volume, through the small passage defined between the free end of each vane 60 and the facing cylindrical surface portion on the internal face of the external jacket 62.

Such laminating of the oil between vanes 60 and jacket 52 causes damping of the rotational movement and, to damp the angular drag oscillations, the blades 60 are of the highest efficiency when they are symmetrical with each other with respect to the flapping plane BB and perpendicular to the longitudianl axis XX of the flexible arm 9 and of the corresponding blade 1. It should be noted in this connection that, in the upper half of FIG. 2, the section of the combined bearing device has been shown after rotating through 90° with respect to the rest of the rotor section for the sake of clarity of the drawings, and not because the vanes 60 are symmetrical with each other with respect to the drag plane.

In this construction, the visco-elastic elastomer 52-63 of the spherical ball-joint also provides, in addition to the elastic return under flapping and dragging conditions already mentioned, damping of the dragging rotational movement, this damping is secondary with respect to that caused by laminating the oil by means of vapors 60, during angular dragging movements from the initial radial position of the corresponding blade as during resilient returns towards this initial position.

The housings 59 containing the inflated pneumatic bladders 66 define two hydraulic compensation chambers, which compensate for the variations in volume of the oil of the damper which may possibly be caused by differeces between the variations in volume of the compressed and expanded damping chambers, and especially by the thermal expansion of this oil, and such compensation is provided by the compression of the inflatable bladder 66.

In addition, the passage 65 providing communication between the compensation chambers 59 and the damping chambers 58a and 58b, which are defined by the assembled clearance between the external jacket 62 and the external frame 51, are calibrated so as to form a dynamic filter for the operating frequencies of the rotary hydraulic damper (from 16 to 21 Hz for a rear rotor, and from 4 to 6 Hz for a main rotor).

Figure 6:
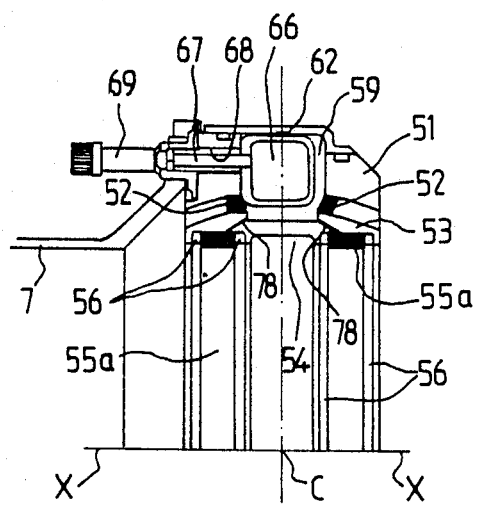
FIG. 6 is a half sectional view through VI—VI of FIG. 3.
Figure 7:
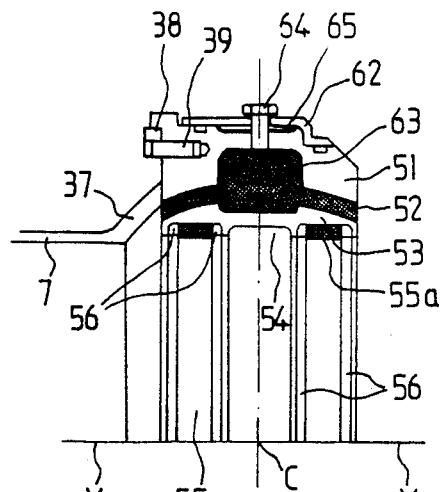
FIG. 7 is a half sectional view through VII—VII of FIG. 5.

Simultaneously, the hydraulic chambers 59 fulfill the function of compensation chambers for a hydraulic automatic play take-up device of the cylindrical angle of attack bearing, compensating for the wear by friction of the rings 55 of this bearing, so as not to reduce the efficiency of this latter, the play is taken up hydraulically, by placing each compensation chamber in communication with the annular volume defined in each of the grooves holding the friction rings 55 between, on the one hand, the resilient seals 56, 57 and the half rings 55a and 55b and, on the other hand the bottom of the corresponding groove, such communication being provided by fine ducts 7 formed through the internal frame 53 (see FIG. 6). The resilient seals 56 and 57 thus ensure not only suspension and retention of the half rings 55a and 55b with respect to the internal frame 53, but also sealing of the hydraulic automatic play take-up device and provide the degree of radial freedom of the half rings whose annular play they also partition off.

Under static operation, they play is taken up by diametrical or radial movement of the half rings 55a and 55b against sleeve 46 of the dry cylindrical angle of attack bearing, under the action of the static pressure of the oil of the damper, which is determined by the inflation pressure of the pneumatic bladder 66. Under dynamic operating conditions, the angle of attack bearing is blocked without radial play because the fine ducts 78 connecting the bottoms of the holding grooves to the compensation chambers 59 are calibrated so as to form in addition a dynamic filter for the operating frequencies of the damper.

A preferred embodiment of the hydraulic automatic play take-up device is shown schematically in FIGS. 8 to 10, in which can be seen the external 51 and internal 53 frames and the elastomer in strips 52 of the spherical ball joints, the two self lubricating rings 55, each formed of two half rings 55a and 55b of the dry bearing, the hydraulic compensation chambers 59 each containing an inflated pneumatic bladder 66 with inflation tube 67, and the fine ducts 78 connecting chambers 59 to the bottoms of the grooves holding rings 55.

But, in this construction, the two annular and lateral resilient seals 56, connecting the half rings 55a and 55b of the same ring to the side walls of the same groove in the example shown in FIGS. 4 to 6, have been replaced by a single annular resilient seal 76, made from injected elastomer (the same as that forming strips 52 of the sphericl ball-joint) and having a U shaped cross section in which the corresponding half rings 55a and 55b are engaged. The two lateral wings 79 of the U joint 76 are bonded on the inside to the lateral faces of the half rings 55a and 55b and on the outside to the side walls of the groove, whereas the rear or external radial face of the web 80 of the U seal 76 is not bonded to the bottom of the corresponding groove, into which cuts 78 open. This is obtained by interposing a stripping product between the bottom of the groove and web 80 of the U seal 76 before vulcanization of the wings 79 of this latter against the half rings and the side walls of the groove. The relative arrangement of a ring 55, of a U seal 76, of a groove of the internal frame 53 and of a duct 78 is clearly shown in FIG. 10, which is a detail of FIG. 9. In this example also, the annular clearances between the ends of the two half rings 55a, 55b housed in the same U seal 76 are filled by elastomer connections 77 which connect the two wings 79 of this U seal 76 together.

In FIGS. 11a, 11b, 12a, 12b and 13 another example has been shown of a rear helicopter rotor incorporating combined cylindrical bearing angle of attack devices with visco-elastic spherical ball-joint and integrated hydro-elastic damper, similar to the one already described.

Figure 3:
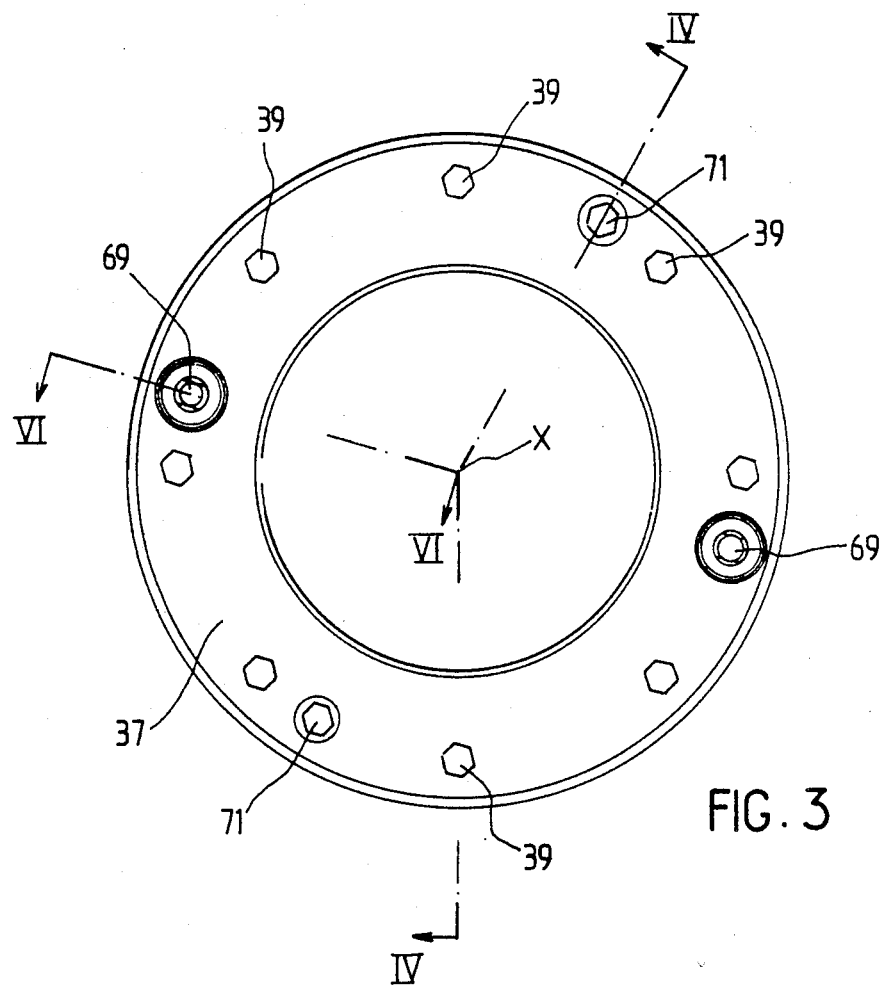
FIG. 3 is a side elevational view of the side turned towards the blade of the rotor, of the combined bearing device of the rotor shown in the upper half of FIG. 2.

Since the three blade rear rotor of this example is functionally equivalent to the four blade rear rotor described with reference to FIGS. 1, 3 and 10 and in the upper half of FIG. 2, only the structural differences which are proper to this new example will be described more particularly.

Figure 11A:
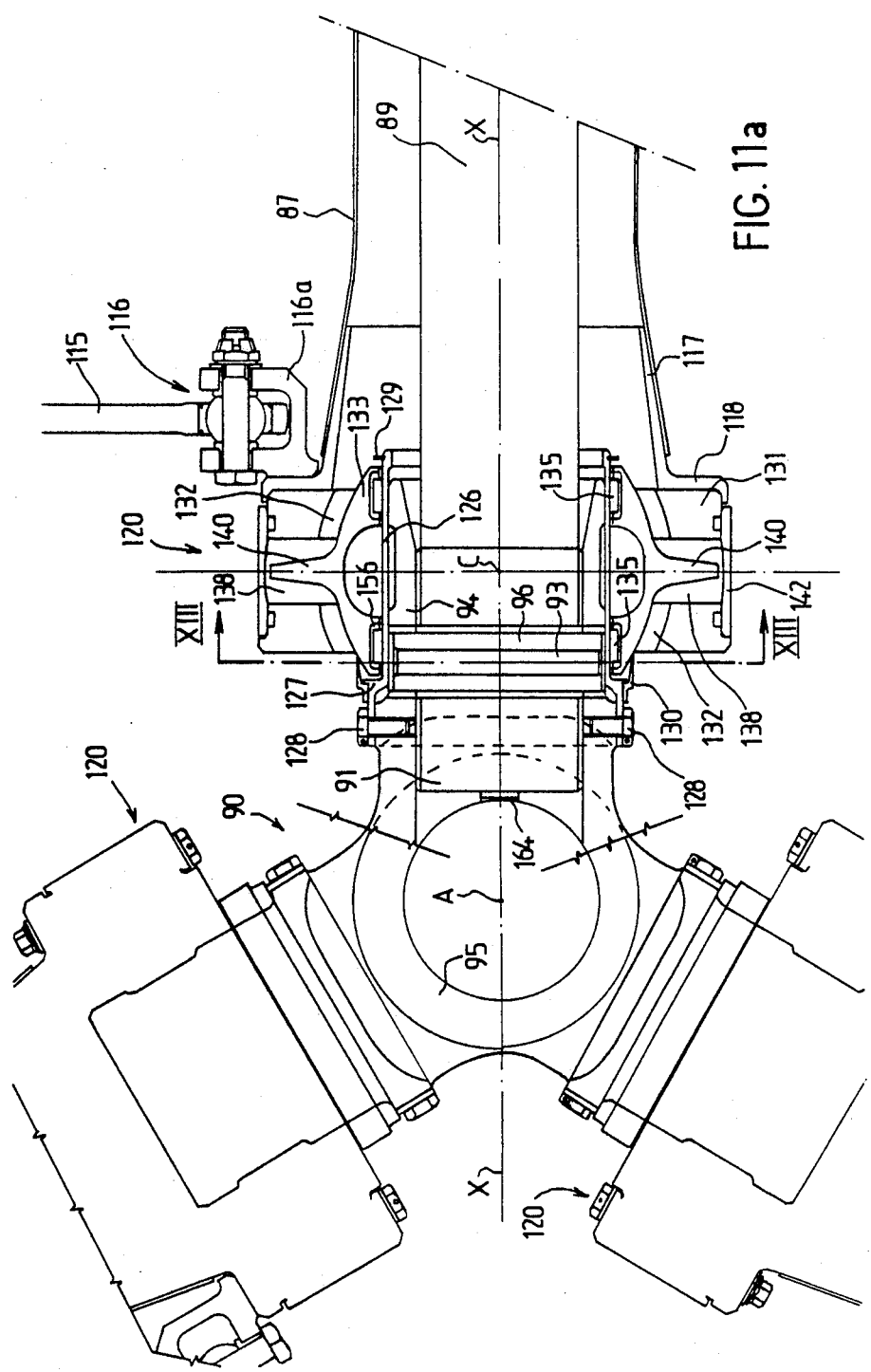
Figure 11B:
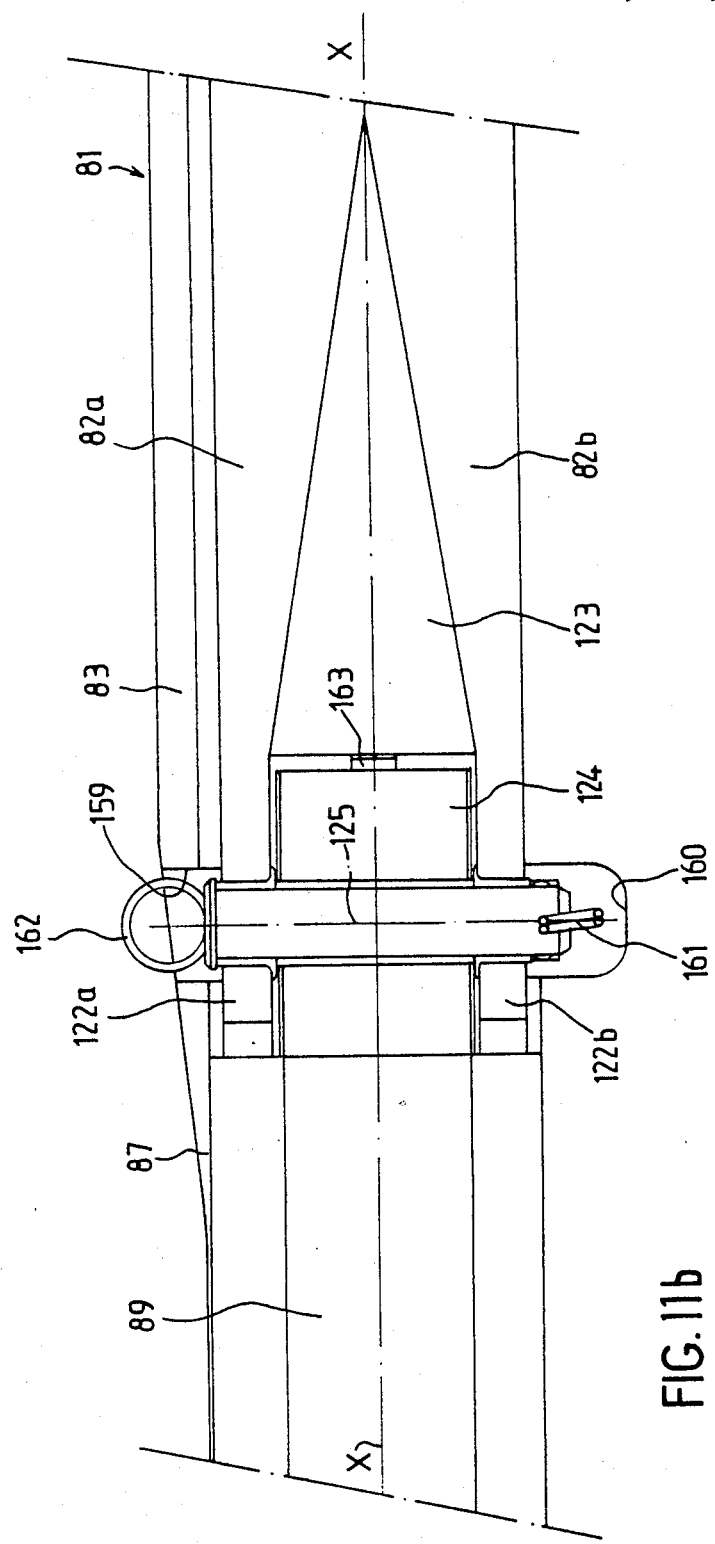

Each of the three blades 81 is connected to hub 90 by a flexible arm 89 and by a rigid tubular stub sleeve 87, which is made from a carbon fiber composite and is fixed to the external frame 131 of a combined bearing device 120 by a socket 117 fitted and retained in the internal end of the rigid stub sleeve 87 having a radial flange 118 bent back about and bolted against frame 131 by bolt-nut assemblies 119 passing through the whole of frame 131, (see FIG. 12a) and some of which provide simultaneously the fixation, on the external surface 1f flange 118, of a lateral fork joint 116a in which is mounted the ball joint articulation 116 of the corresponding end of the pitch control link 115. As shown in FIG. 11a, the two laminating vanes 140 of the rotary hydraulic damper are formed as a single piece with the internal frame-stator 133, connected by the elastomer strips 132, of the visco-elastic spherical ball-joint to the external frame - rotor 131, to hydraulic damping 138 and compensation 139 chambers closed outwardly by the external jacket 142.

In this example, a single compensation chamber 139 is provided in a lower housing of frame 131 (see the bottom of FIG. 12a) and contains a sealed bladder 146 inflatable by the pneumatic valve 149. The compensation chamber 139 is connected by a fine duct 158 to the bottom of each of the holding grooves in which the self lubricating rings 135 are reatined by resilient U seals 156. The bottom of the housing formed in a frame 131 in its upper part (see FIGS. 12a) is filled by a solid elastomer block 143 which connects the two lateral elastomer strips 132 together.

Rings 135 and the internal frame 133 of the cylindrical angle of attack bearing, as well as the integrated visco-elastic spherical ball-joint and the hydro-elastic rotation damper, which surround it and are concentric therewith, may move axially in translation along the cylindrical sleeve 126 of the plain angle of attack bearing, over a path limited outwardly by a circlip 129, fitted on this sleeve 126 and, inwardly, by a shoulder 127 of sleeve 125 which is embedded on and about a tubular and radial hub arm 94, on which sleeve 126 is in addition directly retained by bolts 128. A flexible peripheral bib 130, mounted about shoulder 127, has a lip resiliently bearing against the external spherical surfaces of the internal frame 133, so as to prevent penetration of dust into the plain bearing.

The root 91 of arm 89 thickened or protected by a socket, is fitted and retained in the tubular hub arm 94, beyond the center C of the combined bearing 120 in the direction of axis A of the rotor by a pin 93 with its axis contained in the plane of rotation of the rotor and perpendicular to the longitudinal axis XX of the flexible arm 89 and of the blade 81, and this pin 93 is retained in a coaxial socket 96 housed in coinciding bores passing through root 91 and the hub arm 94, which are cylindrical (see FIG. 13), these coinciding bores being formed substantially at the level of housing 127 of sleeve 126 which thus holds the pin 93 and socket 96 in position after their assembly.

The three hub arms 94? tubular and radial with respect to the axis A of the rotor are formed as a single piece with a tubular and axial hub body 95, itself formed as a single piece with the end 101 of the rotor shaft 98 coaxially thereto, which is rotated about the axis A. In this example, it can be seen that the central and non rotary control shaft 111 is mounted for axial sliding in a tubular shaft section 103, whose external end with respect to the rotor shaft 98 is widened and comprises the radial flange 105 and the axial collar 106 for respectively fixing, by means of bolt-nut assemblies 107 and an external protection bell 108, the shaft section 103 to the control plate 109, having a box like structure made from carbon fiber composite, and axial blocking of this shaft section 103 on the external rings of a double bail thrust bearing 110 whose internal rings are axially blocked on the external axial end of the central control shaft 111.

Of course, the control plate 109 only has three radial pitch control arms 113 (one for each blade 91), and the external radial end of each one is formed as a fork joint housing the ball joint articulation 114 on the corresponding end of the pitch control link 115. The bolt-nut assemblies 107 serve for simultaneously fixing, agains that radial flange 105 of the central shaft 111, the external axial end of a stub sleeve or a flexible tubular bellows 112, extendable and preferably resiliently deformable, for example made from rubber, whose internal axial tubular end is retained about the external axial end of a second tubular shaft section 96, provided with an external radial flange 97 by means of which the shaft section 96 is secured to the external axial end of the hub body 95. The role of this extendable stub sleeve 112 is to protect against the penetration of foreign bodes into the sliding and rotary connection connecting the control shaft 111 to the hub body 95. To this end, the second tubular shaft section 96 is engaged axially in the hub body 95, in which it is centered, in the vicinity of its internal axial end, by means of an annular centering bearing surface 110, and about the first tubular shaft section 103, with which it is interlocked for rotation by its internal axial splines 102 engaged with the external axial splines 104 of the shaft section 103. This latter thus slides axially in the shaft section 96 and is driven in rotation by this latter, interlocked with the hub body 95 and the rotor shaft 98.

Another important difference of this example with respect to the preceding examples, is that the flexible arm 89, associated with each blade 81, is not formed as a single piece with the longitudinal member 82 of this latter, but is coupled to this longitudinal member by a movable connection, the flexible arm 89 being considered as forming an element of the hub, whereas the rigid tubular stub sleeve 87 remains in the extension of the profiled shell 83 of blade 81, and may be formed as a single piece therewith.

Figure 12A:
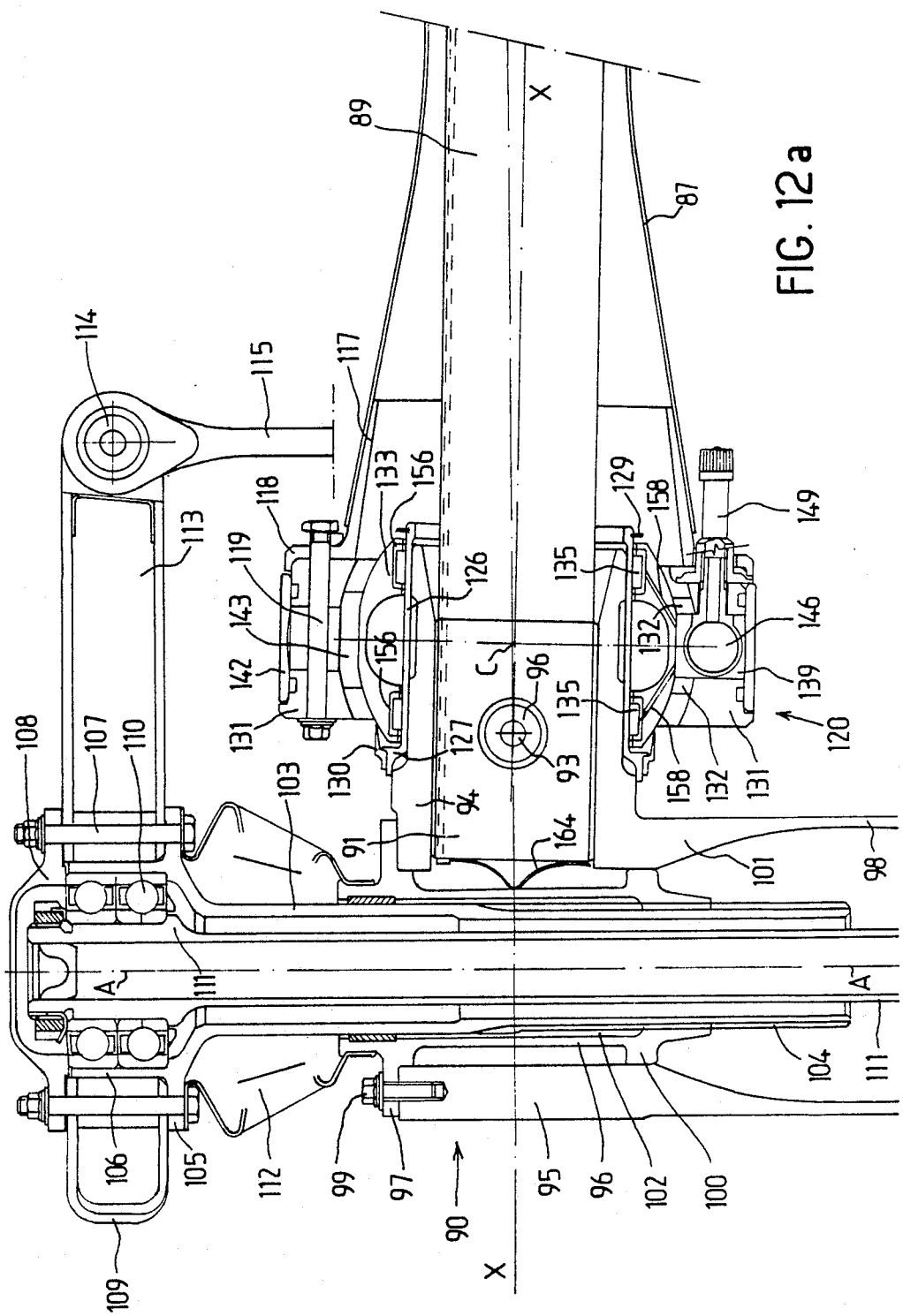
Figure 12B:
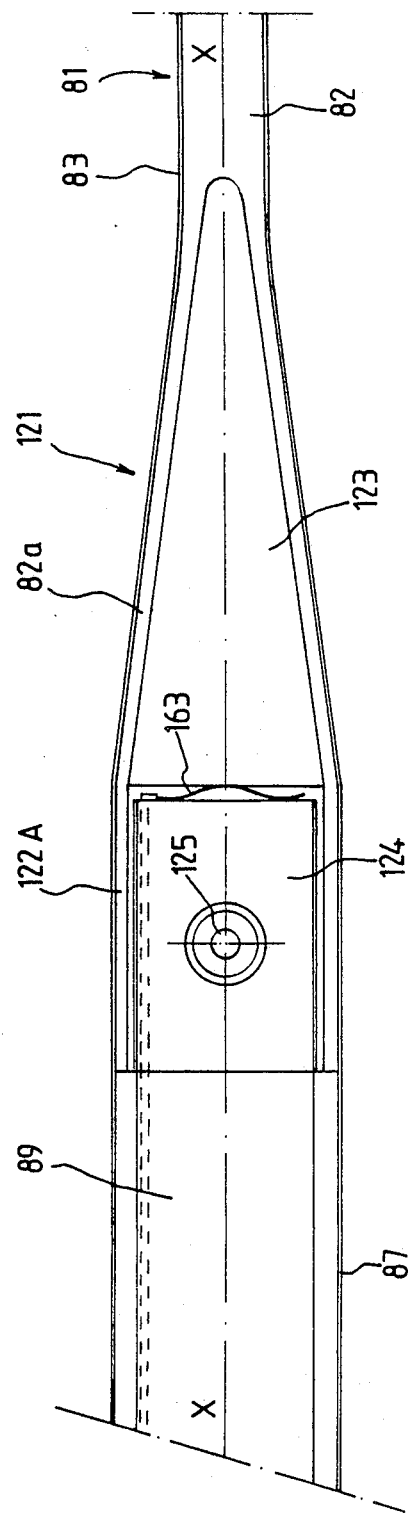
Figure 13:
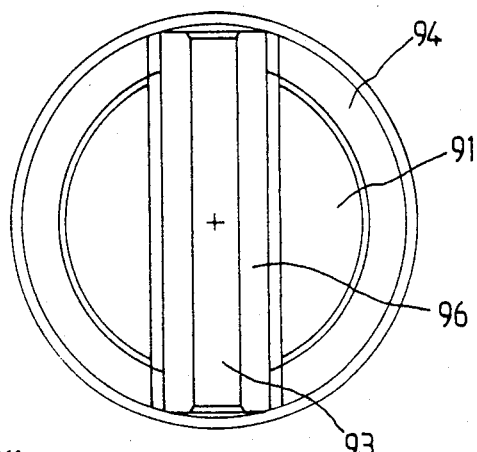
FIG. 13 is a section through XIII—XIII of FIG. 11a, FIG. 14 is a view partially seen from the top and partially in section of the central part of a main four bladed helicopter rotor.
Figure 16:
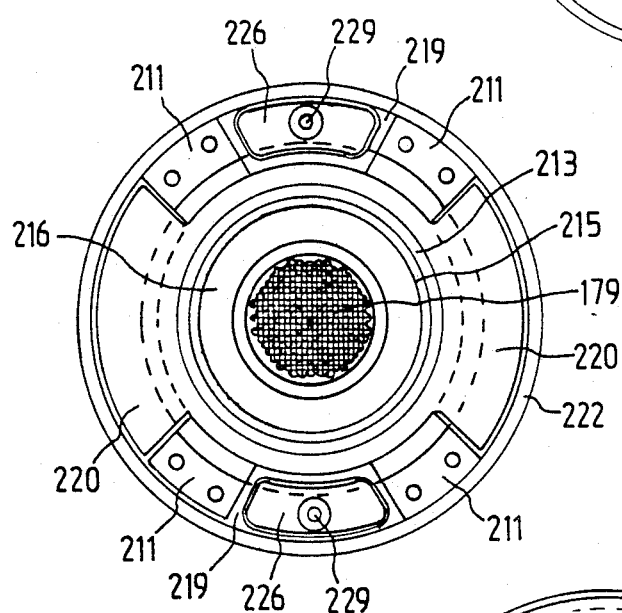
FIG. 16 is a sectional view through XVI—XVI of FIGS. 14 and 15.
Figure 17:
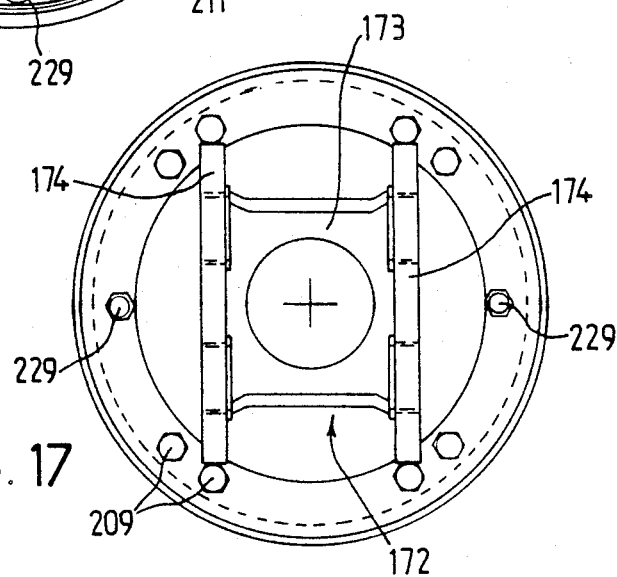
FIG. 17 is an end view in the direction of arrow F in FIG. 14.

Foot 121 of blade 81 is made thicker and this thickness increases progressively, in the flapping plane, from the thickness of the current part 81 of the blade as far as the diameter of the external end of stub sleeve 87, as shown in FIG. 12b. But, in the blade foot 121, the longitudinal member 82 thereof is subdivided into two front 82a and rear 82b halves separated by a space which increases progressively in width (in the drag plane) and in height (in the flapping plane) as far as the internal end 122a and 122b of the longitudinal member halves 82a and 82b, which are parallel to each other and form a fork. This internal space is occupied by a filling wedge 123 made from a cellular material.

The external end 124 of the flexible arm 89, which may be made thicker or protected by a socket, is engaged between the two branches 122a, and 122b of the blade longitudinal member 82 forming a fork 82a, 82b and is retained in position by a transverse pin 125, whose axis is prependicular to the longitudinal axis XX of the blade 81 and extends in the drag plane of this latter, i.e. parallel to point 93 connecting the root 91 of the flexible arm 89 in the tubular radial arm 94 of hub 90. Pin 125 is inserted into coinciding bores formed through branches 122a and 122b of the fork shaped longitudinal member and the external end 124 of the flexible arm 89 after passing through an opening 159 formed in the blade shell 83 at the level of the leading edge, and until the end of the pin projects into a recess 60 provided in the filling body between branch 122b of the longitudinal member and the blade shell, in the part adjacent the trailing edge of the blade, a metal and resilient clip 161 being mounted in this recess 160 on the end of pin 125 so as to retain it in position, whereas a pull ring 1-62 provided at the other end of pin 125, makes it possible to withdraw it after removing clip 161, so as to uncouple the blade 81 from the corresponding flexible arm 89.

The combined bearing device which is rotary for control of the pitch and swivelling for resilient return of the blade under flapping and drag conditions, with internal damping of the annular oscillations of the blade under drag conditions such as described in the preceding examples, may also equip a main rotor, for example a four blade rotor, as shown in FIGS. 14 to 17.

In this last example, hub 180 has four tubular radial extensions 184, formed as a single piece, the assembly thus formed being fixed by a ring of bolt-nut assemblies 189–190 to the external radial flange 191 of the upper end of the rotormast 188, which carries an annular U shaped support 192, open out wardly and in which there is mounted for radial sliding, in a way known per se, a reciprocal ring 193 of a flapping stop device provided for limiting the downward flapping movements of blades 171, at slow or zero rotational speeds of the rotor.

Each flexible arm 179 is, as in the preceding examples, retained by its root in the corresponding extension 184 and the rigid tubular stub sleeve 177, in the form of a truncated cone, which surrounds it as far as adjacent hub 180, is supported on the corresponding radial extension 814 by a combined bearing device 210 practically equivalent to the one described in the preceding example. We can see the external 211 and internal 213 frames forming rotor and stator respectively of the hydraulic rotation damper the elastomer strips 212 of the spherical resilient return ball joint, the two rings 215 each housed in an elastic U seal bonded to the lateral walls of a holding groove in the internal frame 213, sleeve 216 embedded about the corresponding radial extension 184 of the hub and forming, with the two rings 215, the dry cylindrical angle of attack bearing, the two internal damping chambers 218, each housing a laminating vane 220 formed as a single piece with the internal frame 213, the two compensation chambers 219, each housing an inflatable bladder 226 connected to its inflation valve 229, the external jacket 222 closing the damper radially and the ducts 238 connecting the compensation chambers 219 to the bottom of grooves, behind the rings 215, for hydraulically and automatically taking up the play of the plain bearing, and the operation of this combined bearing device will not be described again, for it is identical to that of the preceding example.

Figure 14:
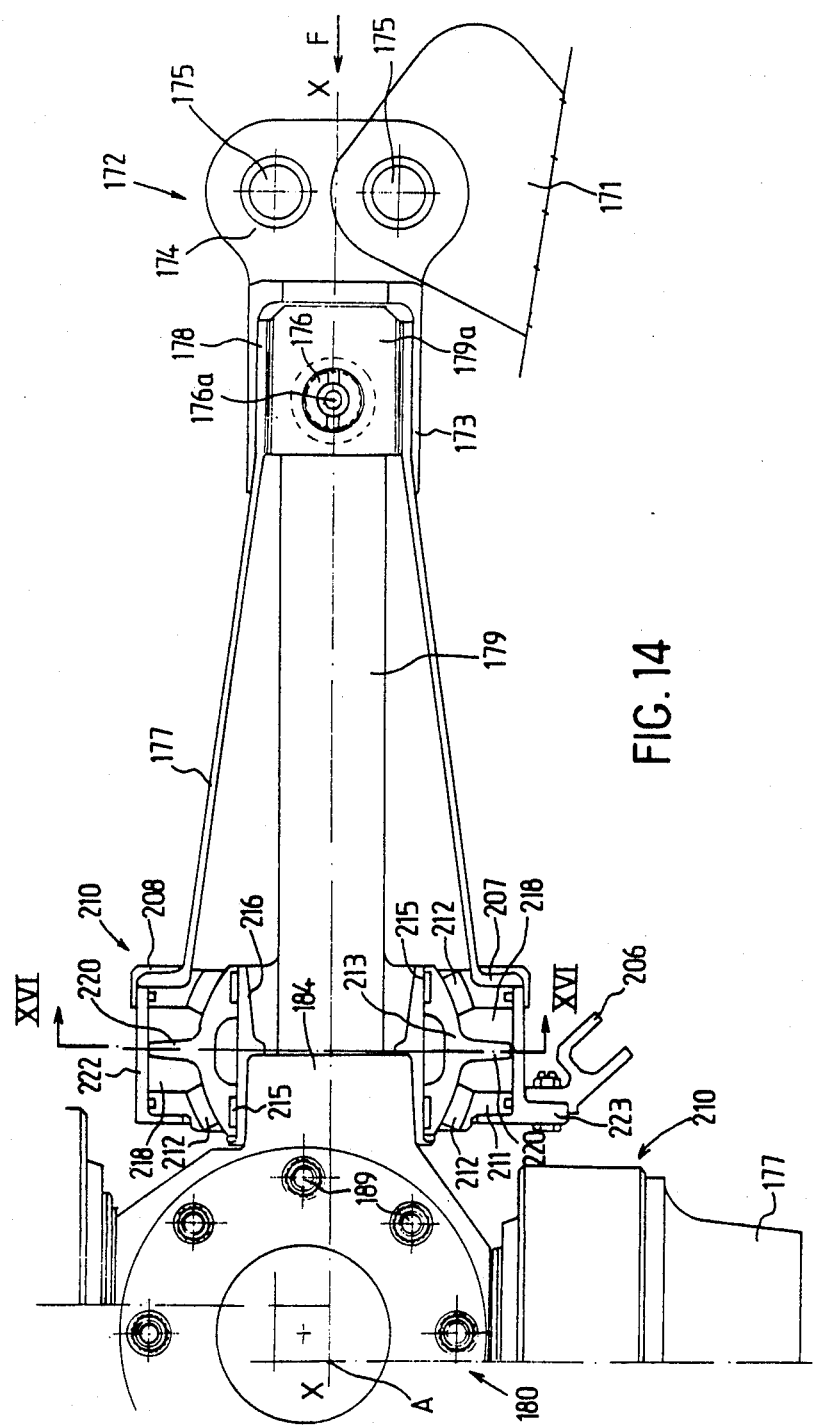
Figure 15:
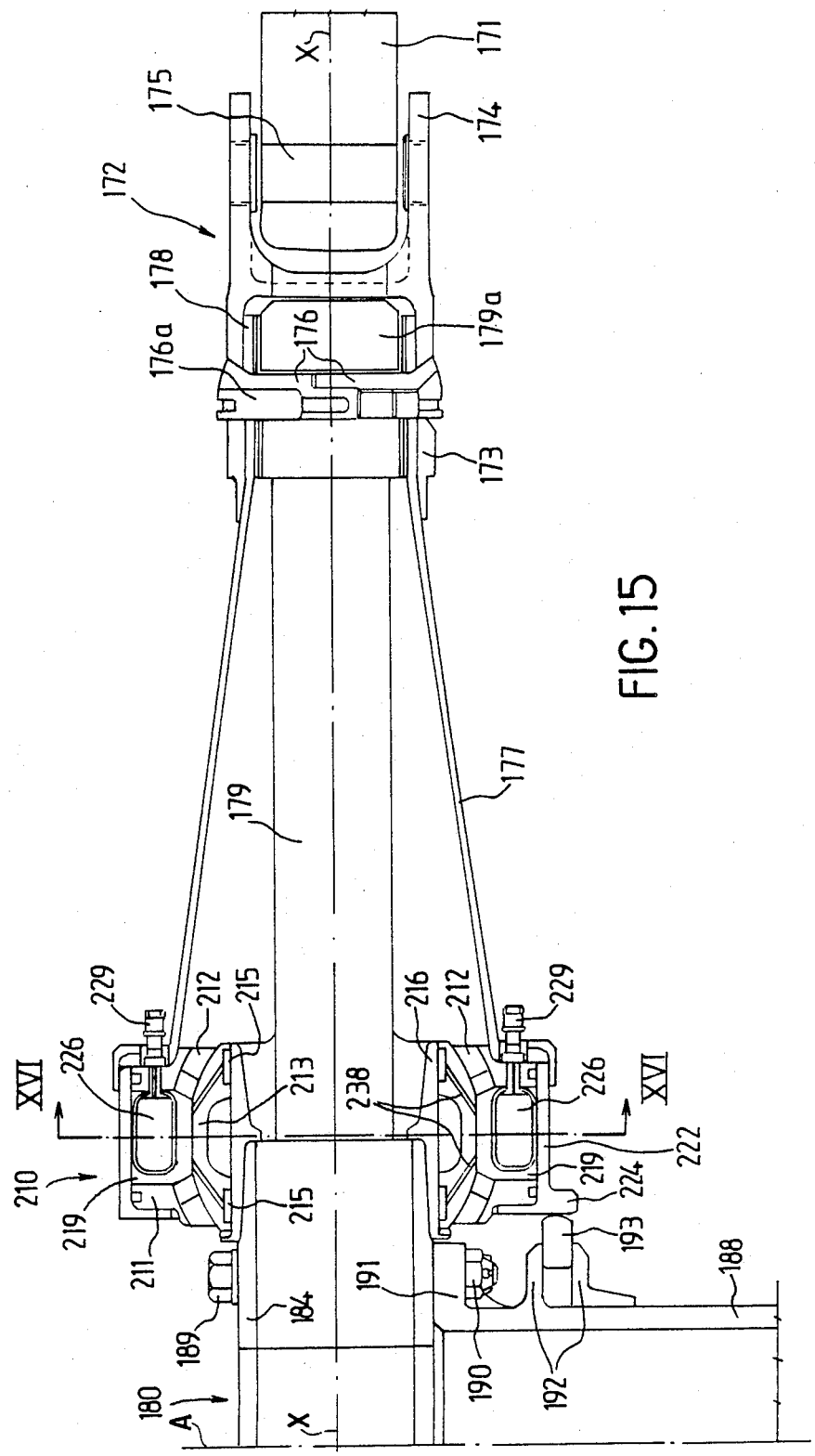
FIG. 15 is a view partially in side elevation and partially in section of the central part of the rotor of FIG. 14.

But in addition, in this example, the external jacket 222 which covers the internal lateral face (towards the axis A of the rotor) of the external frame 211, has a boss 223 projecting laterally substantially in the direct plane, and on which a fork joint 206 for articulation of the pitch control lever is bolted (see FIG. 14). Moreover, this external jacket 222 also has a downwardly projecting heel 224 (FIG. 15) which forms the low stop cooperating with the reciprocal ring 193 of the downward flap limiting device.

As in the preceding examples, the internal end of stub sleeve 177 in the form of a radial flange 207 is fixed agist the external frame 211 of the bearing device 210 by a ring of bolts 209, but these bolts 209 cooperate with a fixing and centering collar 208 also covering the jacket 222.

On the other hand, in this example, the external cylindrical ends 178 and 179a respectively of sleeve 177 and of the flexible arm 179 are fixed to each other by two tubular half pins 176 with conical head and interfittable shanks, which are clamped one against the other by a central bolt 176. The two external ends 178 and 179a, one in the other, are further simultaneously engaged and retained by the same elements 176–176a in a fork joint or internal sleeve 173 of a connecting piece 172 to a blade 171. This connecting piece 172 is formed as a double external fork joint 174 by two parallel legs symmetrical with respect to the drag plane, and each formed with two bores coaxial with the bores of the other legs so as to receive two pins 175 for retaining the blade foot 171, one of the pins 175 being removable so that blade 171 can be pivoted about the other, as shown in FIG. 14. The axes of the two pins 175 are in the same plane, perpendicular to the longitudinal axis XX of arm 175, as well as to the plane of rotation of the rotor, and they are parallel to the axis of the two half pins 76 assembled and clamped one against the other.

In this case also, arm 179 may be considered as an element of the hub, as well more over as the connecting piece 172, to which the corresponding blade 171 is removably coupled. Similarly, the tubular stub sleeve 177 is an element of the hub.

Coming back to the example shown in FIGS. 11a to 12b, the presence of a small blade spring 163 will be noted between the filling wedge 123 and the external end 124 of the flexible arm 89, and that of a second small blade spring 164 between the root 91 of this arm 89 and the second tubular shaft section 96 of hub 90, for providing electric continuity between the blade and the hub and so as to evacuate to the fuselage the static electricity generated by the rotating blades made from non metallic materials.

What is claimed is:

1. A combined angle of attack bearing device with resilient return under drag and flapping conditions and with incorporated drag damping, for equipping a variable pitch rotor of a rotorcraft, in which each blade is held on the hub of a rotor by means of an elongate arm forming a tie rod which is flexible under torsion and flexion, substantially radial with respect to the axis of rotation of the rotor, which allows flapping and drag oscillations of the blade as well as angular variations of its pitch, and which is surrounded without contact, as far as the hub by a tubular stub sleeve which is rigid under torsion and flexion, acted on externally by a lever controlling the blade pitch, and whose end the nearest the axis of the rotor is intended to be connected to the hub by said combined bearing device which is intended to surround the root of the flexible arm on the hub and which includes a spherical ball joint articulation centered on the axis of the flexible arm and having at least one element of a visco-elastic material with high deformation remanence, substantially in the form of a spherical skull cap portion, which is retained between two rigid supports, one of which, of annular form, is intended to be fixed to the stub sleeve and the other of which is intended to be connected to the hub, the spherical ball joint articulation permitting, about its center, a relative freedom of angular movement of the blade under flapping and drag conditions, by shearing of the visco-elastic material which ensures resilient return of the blade under flapping and drag conditions as well as damping of the angular movements of the blade under drag conditions of the blade, said combined bearing device further including a plain cylindrical bearing for angle of attack articulation and embedment on the hub, which is connected to the rigid support of the spherical ball joint articulation, intended to be connected to the hub, and which is substantially concentric with the other rigid support of the spherical ball joint articulation, itself mounted concentrically with respect to the plain cylindrical bearing which is radially in series with this latter with respect to the axis of the flexible arm.

2. The combined bearing device as claimed in claim 1, wherein the the spherical ball joint articulation is mounted for free translational movement with limited axial clearance parallel to the axis of the plain cylindrical bearing.

3. The combined bearing device as claimed in claim 1, intended to be fixed to the corresponding sleeve by that one of the two rigid supports which is in an external radial position on the spherical ball joint articulation wherein the other rigid support, in an internal radial position, of the spherical ball joint articulation is connected to the plain cylindrical bearing, which is a dry bearing, surrounded by the spherical ball joint articulation, and has a cylindrical sleeve for fixing to the hub and about which the internal rigid support is journalled by means of at least two self lubricating rings spaced from each other along the axis of the sleeve and each housed in an annular holding groove formed in the inner radial face of the internal rigid support.

4. The combined bearing device as claimed in claim 3, wherein each self lubricating ring is formed of two half rings each having a semicylindrical shape and which are housed in the same annular holding groove.

5. The combined bearing device as claimed in claim 1, also including a device for automatically taking up the play of the plain cylindrical bearing.

6. The combined bearing device as claimed in claim 5, wherein the automatic play take up device is a hydraulic device having at least one compensation chamber filled with a hydraulic fluid pressurized by at least one pressurization mechanism and in communication with each of the annular holding grooves, between the corresponding ring and the bottom of the groove, by at least one duct, so that the play is taken up by diametrical movement of the rings under the action of the pressure of the hydraulic fluid in each compensation chamber.

7. The combined bearing device as claimed in claim 6 wherein each ring is connected sealingly to each of the two lateral faces of the annular groove in which it is housed by means of a flexible annular seal, preferably elastically deformable.

8. The combined bearing device as claimed in claim 7, wherein each ring is engaged in a flexible and annular seal having a U cross section housing the corresponding holding groove, to the lateral faces of which the wings of the U seal are secured, whereas the base of the U seal, between the ring and the bottom of the groove, is not secured to this groove bottom into which at least one duct opens for communicating with at least one hydraulic compensation chamber.

9. The combined bearing device as claimed in claim 4, wherein each half ring is connected by both ends to both ends of the other half ring housed in the same holding groove by the two flexible connections, preferably elastically deformable.

10. The combined bearing device as claimed in claim 9 as attached to claim 8, wherein each of the two flexible connections is secured to the U seal, whose wings it connects together.

11. The combined bearing device as claimed in claim 7, wherein the seals and flexible connections, are in the form of elements made from a visco-elastic material, such as an elastomer, and preferably the same as that of the visco-elastic element or elements of the spherical ball joint articulation.

12. The combined bearing device as claimed in claim 6, wherein the mechanism for pressurizing the hydraulic fluid in each compensation chamber includes at least one flexible membrane, preferably elastically deformable, defining said compensation chamber at least partially.

13. The combined bearing device as claimed in claim 12, wherein the flexible membrane of each compensation chamber is a sealed bladder housed in the corresponding compensation chamber and inflatable by means of a gas supply valve which is accessible from outside the bearing.

14. The combined bearing device as claimed in claim 6, wherein the hydraulic play take up device is at least partially integrated in the spherical ball joint articulation, at least one hydraulic compensation chamber being defined at least partially between the internal and external rigid supports and/or in a recess of one at least of the rigid supports of the spherical ball-joint, and the compensation chamber is sealed by at least one visco-elastic material element of the spherical ball-joint.

15. The combined bearing device as claimed in claim 1, wherein the spherical ball-joint comprises a single visco-elastic material element, which is a strip of high hysteresis elastomer, in the form of a spherical skull cap adhered by its internal and external radial faces, respectively concave and convex, to the respectively external convex and internal concave radial faes of the respectively internal and external rigid supports, and the plain cylindrical bearing sleeve has an internal radial flange for bolting to an external radial flange of a sleeve for fixing the root of the corresponding flexible arm, to the hub.

16. The combined bearing device as claimed in claim 1 further comprising a hydraulic damper for damping the angular oscillations of the blade under drag conditions mounted in radial series with the plain cylindrical bearing, which is a rotation damper and being of the type with coaxial stator and rotor defining therebetween at least one internal damping chamber filled with a hydraulic fluid, such as a high viscosity silicon oil, and at least one vane fixed to the rotor or the stator and subdividing the internal chamber into two damping chambers connected together by laminating means, so that any relative rotational movement of the rotor and the stator about their common axis causes rotation of the vane in the internal chamber, while compressing one of the two damping chambers and causing an expansion in the otherone, thus providing damping of the rotational movement by lamination, through laminating means of the fluid flowing from the compressed damping chamber to the expanded damping chamber, the stator being secured to the rigid support of the spherical ball-joint which is connected to the plain cylindrical bearing, and the rotor being secured to the rigid support of the spherical ball-joint which is intended to be fixed to the corresponding tubular sleeve.

17. The combined bearing device as claimed in claim 16, wherein the laminating means are associated with the vane.

18. The combined bearing device as claimed in claim 17, wherein the laminating means may be simply formed by a narrow passage defined between the free end of the vane carried by the rotor or the stator and a facing surface on the stator of the rotor.

19. The combined bearing device as claimed in claim 16, wherein each internal chamber of the damper may be advantageously sealed by at least one visco-elastic material member connecting the rotor to the stator while providing, with internal damping, resilient return towards the initial position of the rotor with respect to the stator.

20. The combined bearing device as claimed in claim 16, wherein each internal chamber of the hydraulic to at least one chamber for compensating the expansion of the hydraulic fluid, which is pressurized by a pressurization mechanism providing static pressurization of the damper.

21. The combined bearing device as claimed in claim 20, wherein the pressurization mechanism includes at least one flexible member, preferably elastically deformable, which defines at least partially the corresponding expansion compensation chamber.

22. The combined bearing device as claimed in claim 21, wherein the flexible membrane of the pressurization mechanism is a sealed bladder, housed in the corresponding expansion compensation chamber and inflatable by means of a gas supply valve accessible from outside the bearing.

23. The combined bearing device as claimed in claim 20, wherein the communication passage or passages between an expansion compensation chamber and an internal chamber of the damper is or are calibrated so as to form a dynamic filter for the operating frequencies of the damper.

24. The combined bearing device as claimed in claim 20 wherein each expansion compensation chamber and its pressurization mechanism, preferably comprises an inflatable bladder, to form simultaneously and respectively a compensation chamber for a hydraulic play take-up device of the plain cylindrical bearing and its pressurization mechanism preferably including an inflatable bladder.

25. The combined bearing device as claimed in claim 24 wherein the duct or ducts connecting the compensation chamber to a groove holding a ring of the plain cylindrical bearing is or are calibrated so as to form a dynamic filter for the operating frequencies of the damper.

26. The combined bearing device as claimed in claim 20, wherein the sealing of each chamber for compensating the expansion of the fluid of the hydraulic damper is provided by at least one visco-elastic material element of the spherical ball-joint.

27. The combined bearing device as claimed in claim 26, wherein the hydraulic damper is at least partially integrated in the spherical ball joint articulation, at least one internal chamber of the damper being defined at least partially between the rigid internal and external supports and/or in a recess in one at least of the rigid supports of the spherical ball joint.

28. The combined bearing device as claimed in claim 27, wherein the stator, the rotor, and at least one visco-elastic material member which joins them together are formed respectively by the internal rigid support, the external rigid support and at least one visco-elastic material element of the spherical ball-joint.

29. The combined bearing device as claimed in claim 28, wherein the hydraulic rotation damper comprises two radial laminating vanes symmetrical with each other with respect to the axis of the plain cylindrical bearing and which are secured to the internal support of the spherical ball-joint and each extend perpendicularly to the drag plane and symmetrically above and below the drag plane of the corresponding blade into one of two chambers each defined by a recess extending radially and in the circumferential direction in the external rigid support, by a part of the external radial surface of the internal rigid support which is facing the corresponding recess of the external support and about the foot of the vane engaged in this recess, and by annular surface portions of the visco-elastic material element or elements connecting the two rigid supports to each other.

30. The combined bearing device as claimed in claim 29, comprising two hydrualic commpensation chambers, symmetrical with each other with respect to the axis of the plain cylindrical bearing and with respect to the drag plane each one being defined by one of two recesses extending radially in the circumferential direction in the external rigid support, in positions alternating with the recesses of the damping chambers in the circumferential direction, each compensation chamber being also defined by a part of the external radial surface of the internal rigid support opposite the corresponding recess and by annular surface portions of the visc-elastic material element or elements connecting the two supports together, at least one compensation chamber being connected to each holding groove of a ring of the plain cylindrical bearing by a duct, preferably calibrated, which passes through the internal rigid support.

31. The combined bearing device as claimed in claim 30, wherein the recesses of the vane housing and/or compensation chambers are closed radially externally by an external jacket sealingly and removably mounted on the periphery of the external rigid support.

32. The combined bearing device as claimed in claim 31, wherein the passages, preferably calibrated, for communication between an internal damping chamber and a compensation chamber are defined by a radial clearance between the external jacket and the external rigid support.

33. The combined bearing device as claimed in claim 30, wherein each internal damping chamber is separated from each of the compensation chambers between which it is situated in the circumferential direction by a solid elastomer stud, integral with the visco-elastic element or elements connecting the two rigid supports together.

34. The combined beraing device as claimed in claim 29, wherein the visco-elastic element or elements of the spherical ball joints advantageously comprise two annular strips in the form of a spherical skull cap bonded laterally to the two rigid supports and between them, and each of a maximum width at the levels of the recesses housing the vanes.

35. The combined bearing device as claimed in claim 34, wherein in addition, the annular visco-elastic strips are preferably of minimum width at the levels of the recesses of the compensation chambers.

36. The combined bearing device as claimed in claim 29, wherein each laminating vane is removably fixed on the external radial surface portion of the internal support which forms the bottom of a corresponding recess.

37. The combined bearing device as claimed in claim 36, wherein the removable fixing is provided, for each vane on the internal support by means of at least one screw engaged radially from the inside in a recess formed in the internal radial face of the internal support, between two cylindrical bearing surfaces in each of which is formed one of the grooves for holding a ring of the plain cylindrical bearing.

38. The combined bearing device as claimed in claim 30, wherein the external rigid support is formed with at least three axial passages each opening into an internal damping chamber and in one of which is fitted a hydraulic fluid filling valve, which is accessible from the outside, preferably on the same side as the connection to the rigid tubular sleeves whereas a drain valve and a drain screw are fitted in another of the substantially axial passages and are accessible from the outside, preferably on the side intended to be turned towards the hub, the external rigid support being further formed with two other substantially axial passages each opening into a compensation chamber, and in each of which an inflation valve is fitted, accessible from the outside, preferably on the same side as the connection to the sleeve.

39. A variable pitch rotor for rotorcraft, usable as the main rotor or as rear rotor for helicopters, and including a rotorhub driven in rotation about an axis of rotation of the rotor by a rotor mast, blades, each of which is retained on the hub by means of an elongate arm forming a tie rod, substantially radial with respect to the axis of the rotor, and flexible under flexion and torsion conditions for allowing the flapping and drag movements and angular variations of the pitch of the correspondig blade, and which is surrounded without contact, as far as the vicinity of the hub, by a tubular sleeve rigid under torsion and flexion forces urged externally by a lever controlling the pitch of the corresponding blade, and whose end the nearest to the rotor axis is connected to the hub by a combined angle of attack bearing device, with resilient return of the corresponding blade under flapping and drag conditions, and with incorporated damping of the angular oscillations of the blade under drag conditions, which surrounds the root of the corresponding flexible arm on the hub, and which includes a spherical ball joint articulation centered on the axis of the flexible arm and having at least one visco-elastic material element with high deformation remanence, substantially in the form of a spherical skull cap portion which is retained between two rigid supports, one of which is of annular shape and is secured to the sleeve and the other of which is connected to the hub, so that the spherical ball joint articulation allows, about its center, a relative freedom of movement of the blade under flapping and drag conditions, by shearing of the visco-elastic material, which provides resilient return of the blade under flapping and drag conditions, as well as damping of the angular oscillations of the blade under drag conditions, wherein the combined bearing device is, a device such as claimed in claim 1.

40. The rotor as claimed in claim 39 wherein the internal end of the sleeve is secured to the combined bearing device by screwing a substantially radial external flange carried by the sleeve to the external rigid support of the bearing device.

41. The rotor as claimed in claim 40 wherein the substantially radial external flange is bent back about the external support of the bearing device and a single piece with a socket fitted and held in the tubular internal end of the sleeve, made preferably from a composite material, and in the extension of a profiled shell of the corresponding blade.

42. The rotor as claimed in claim 40 wherein the external end of the sleeve is connected to the internal end of the profiled shell of the blade by screwing against the sleeve an external radial flange of a socket fitted and retained in the tubular internal end of the profiled shell of the blade.

43. The rotor as claimed in claim 39 wherein the hub includes a tubular central body, coaxial with the rotor shaft, and radial extensions, with respect to the axis of the rotor, and in number equal to the number of blades, for connecting these latter to the hub.

44. The rotor as claimed in claim 43 wherein the hub is secured to the rotor shaft by bolting, against an end flange of the shaft which is radial with respect to its axis, the part of the radial extensions which is turned towards the shaft.

45. The rotor as claimed in claim 43 wherein the radial extensions and the tubular body of the hub are formed in a single piece with the end of the rotor shaft.

46. The rotor as claimed in claim 43 wherein the flexible arm is extended towards the rotor axis, beyond the center of the corresponding combined bearing device, by a root part, possibly thickened, by which the arm is fixed to a radial extension of the hub.

47. The rotor as claimed in claim 46 wherein the root part of the flexible arm is retained in a sleeve with external radial flange bolted to an internal radial flange of the sleeve of the plain cylindrical bearing, the sleeve being itself retained in a radial extension of the hub by at least one pin with axis substantially parallel to the axis of the rotor and passing through coinciding bores in the root part, the sleeve and the radial extension.

48. The rotor as claimed in claim 46 wherein the sleeve of the plain cylindrical bearing is fitted on or integrated in a tubular and cylindrical radial extension of the hub, in which the root part of the flexible arm is retained by a diametrical pin whose axis is substantially in the plane of rotation of the rotor.

49. The rotor as claimed in claim 43 in particular an antitorque rotor, whose tubular hub body is connected for rotation, through internal splines, to a first tubular shaft section, with external splines, which slides axially in the hub body and whose end, on the side opposite the rotor shaft, projects from the hub body and is secured to a plate controlling the radial arms in number equal to the number of blades and on each of which is articulated an end of a pitch control lever, whose other end drives the sleeve, the control plate being connected by a ball thrust bearing to a non rotary control shaft, coaxial with the rotor shaft and with the first tubular shaft section, and mounted for axially sliding in this later, the hub includes a second tubular shaft section, engaged coaxially in the hub body, to which it is secured by screwing an external radial flange of this second section against an end of the hub body, the internal splines being presented inside the second tubular shaft section through which the first tubular shaft section passes.

50. The rotor as claimed in claim 49, wherein the internal end of the longitudinal member of the blade is in the form of a fork between the two branches of which is engaged the external end, preferably surrounded by a protective socket, of the flexible arm connected to the longitudinal member of the blade by a removable pin with axis perpendicular to the longitudinal axis common to the longitudinal member and to the flexible arm and extending in the plane of rotation of the rotor.

51. The rotor as claimed in claim 43, wherein the external end part, preferably thickened, of the flexible arm and the externally substantially cylindrical end of the tubular essentially truncted cone shaped sleeve, are connected by at least one pin perpendicular to the plane of rotation of the rotor to an internal radial fork joint of a connecting piece shaped as a double external radial fork joint and connected to the foot of the corresponding blade by two pins perpendicular to the plane of rotation of the rotor and one of which is removable so as to allow rotation of the blade about the other one forming a pivot with respect to the flexible arm and the corresponding sleeve.

52. The rotor as claimed in claim 39 wherein the pitch control lever is articulated in a fork joint fixed to a lateral heel of the external rigid support of the combined bearing device or its external jacket.

* * * * *

UNITED STATES PATENT AND TRADEMARK OFFICE
CERTIFICATE OF CORRECTION

PATENT NO. : 4,815,937
DATED : March 28, 1989
INVENTOR(S) : AUBRY et al

It is certified that error appears in the above-identified patent and that said Letters Patent is hereby corrected as shown below:

On the cover page, Item [30], line 2, "Mar. 3, 1987" should read --Mar. 30, 1987--.

Signed and Sealed this

Third Day of October, 1989

Attest:

DONALD J. QUIGG

Attesting Officer

Commissioner of Patents and Trademarks